(12) United States Patent
Nagasawa et al.

(10) Patent No.: US 12,508,846 B2
(45) Date of Patent: Dec. 30, 2025

(54) TIRE

(71) Applicant: The Yokohama Rubber Co., LTD., Tokyo (JP)

(72) Inventors: Hideki Nagasawa, Kanagawa (JP); Hiroto Kikuchi, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 108 days.

(21) Appl. No.: 17/206,875

(22) Filed: Mar. 19, 2021

(65) Prior Publication Data

US 2021/0300123 A1    Sep. 30, 2021

(30) Foreign Application Priority Data

Mar. 31, 2020 (JP) ................. 2020-064451
Mar. 31, 2020 (JP) ................. 2020-064583

(51) Int. Cl.
*B60C 11/03* (2006.01)
*B60C 11/04* (2006.01)
*B60C 11/13* (2006.01)

(52) U.S. Cl.
CPC ...... *B60C 11/0309* (2013.01); *B60C 11/0316* (2013.01); *B60C 11/042* (2013.01); *B60C 11/1353* (2013.01); *B60C 2011/0346* (2013.01)

(58) Field of Classification Search
CPC ..... B60C 11/0306; B60C 11/11; B60C 11/04; B60C 11/0309; B60C 11/0316; B60C 11/042; B60C 11/1353; B60C 2011/0346; B60C 2011/0372; B60C 11/125; B60C 11/0332
See application file for complete search history.

(56) References Cited

U.S. PATENT DOCUMENTS

| 4,271,886 A | 6/1981 | Bachmann et al. |
| 4,284,115 A | 8/1981 | Ohnishi |
| 5,099,899 A | 3/1992 | Takeuchi |

(Continued)

FOREIGN PATENT DOCUMENTS

| DE | 11 2017 006 789 T5 | 11/2019 |
| EP | 2 039 534 A1 | 3/2009 |

(Continued)

OTHER PUBLICATIONS

Ichiki, English Machine Translation of JP H03136911, 1991 (Year: 1991).*

(Continued)

*Primary Examiner* — Blaine Copenheaver
*Assistant Examiner* — Brendon Charles Darby
(74) *Attorney, Agent, or Firm* — Thorpe North & Western

(57) ABSTRACT

A tire includes a plurality of main grooves extending in a tire circumferential direction and four or more rows of land portions defined by the main grooves. Moreover, a middle land portion and a center land portion have a plurality of through lug grooves that pass through the land portions in a tire width direction, respectively. Pitch lengths of the through lug grooves are in a range of from 7% or greater to 14% or less of a tire maximum ground contact length. Additionally, maximum groove depths of the through lug grooves are in a range of from 5% or greater to 65% or less of maximum groove depths of the main grooves.

20 Claims, 26 Drawing Sheets

(56) References Cited

U.S. PATENT DOCUMENTS

| | | | |
|---|---|---|---|
| 2003/0005992 A1 | 1/2003 | Radulescu | |
| 2007/0151645 A1 | 7/2007 | Mathews | |
| 2012/0118458 A1 | 5/2012 | Tobino | |
| 2014/0326381 A1 | 11/2014 | Hamanaka | |
| 2015/0151585 A1* | 6/2015 | Fujioka | B60C 11/125 152/209.18 |
| 2016/0001599 A1* | 1/2016 | Minami | B60C 11/1259 152/454 |
| 2016/0137006 A1* | 5/2016 | Yamamoto | B60C 11/1263 152/209.24 |
| 2016/0159158 A1* | 6/2016 | Washizuka | B60C 11/033 152/209.8 |
| 2016/0318352 A1* | 11/2016 | Hibino | B60C 11/0306 |
| 2016/0347125 A1 | 12/2016 | Itou | |
| 2018/0236820 A1* | 8/2018 | Hamanaka | B60C 11/0332 |
| 2018/0326792 A1 | 11/2018 | Takano | |
| 2019/0366775 A1 | 12/2019 | Suzuki et al. | |
| 2021/0061018 A1* | 3/2021 | Sato | B60C 11/1384 |
| 2022/0032691 A1 | 2/2022 | Wada et al. | |

FOREIGN PATENT DOCUMENTS

| | | | | |
|---|---|---|---|---|
| EP | 2 357 094 | A2 | | 8/2011 |
| EP | 2 949 482 | A1 | | 12/2015 |
| EP | 3 135 504 | A1 | | 3/2017 |
| EP | 3 335 908 | A1 | | 6/2018 |
| GB | 2170153 | A | * | 7/1986 ......... B60C 11/0306 |
| JP | H02-283504 | A | | 11/1990 |
| JP | H03-079406 | A | | 4/1991 |
| JP | 03136911 | A | * | 6/1991 |
| JP | 03231001 | A | * | 10/1991 |
| JP | H11-123909 | | | 5/1999 |
| JP | 2002-114011 | A | | 4/2002 |
| JP | 2003-127616 | A | | 5/2003 |
| JP | 2006-051836 | A | | 2/2006 |
| JP | 2008-273301 | A | | 11/2008 |
| JP | 2009-006771 | A | | 1/2009 |
| JP | 2012-101719 | A | | 5/2012 |
| JP | 2015-081010 | A | | 4/2015 |
| JP | 2016-068635 | A | | 5/2016 |
| JP | 2017-030564 | A | | 2/2017 |
| JP | 2017-071279 | A | | 4/2017 |
| JP | 2017-154708 | A | | 9/2017 |
| JP | 2018-012484 | A | | 1/2018 |
| JP | 2018-020735 | A | | 2/2018 |
| JP | 2019-081490 | A | | 5/2019 |
| JP | 2019-131152 | A | | 8/2019 |
| JP | 2019-182341 | A | | 10/2019 |
| WO | WO 2013/042257 | A1 | | 3/2013 |
| WO | WO 2020/066404 | A1 | | 4/2020 |

OTHER PUBLICATIONS

Ikeda, English Machine Translation of JP H03231001, 1991 (Year: 1991).*

Tanaka, English Machine Translation of JP H11123909, 1999 (Year: 1999).*

* cited by examiner

| | COMPARATIVE EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | EXAMPLE 11 | EXAMPLE 12 | EXAMPLE 13 | EXAMPLE 14 | EXAMPLE 15 |
|---|---|---|---|---|---|---|---|---|---|---|---|---|---|---|---|---|
| MAIN GROOVE SHAPE | ZIGZAG | ZIGZAG | ZIGZAG | ZIGZAG | ZIGZAG | ZIGZAG | ZIGZAG | ZIGZAG | ZIGZAG | ZIGZAG | ZIGZAG | ZIGZAG | ZIGZAG | ZIGZAG | STRAIGHT | CONNECTED ARCS |
| P21/Lt, P31/Lt | 0.33 | 0.08 | 0.10 | 0.13 | 0.10 | 0.10 | 0.10 | 0.10 | 0.10 | 0.10 | 0.10 | 0.10 | 0.10 | 0.10 | 0.10 | 0.10 |
| H21/Hg1, H31/Hg2 | 0.35 | 0.35 | 0.35 | 0.35 | 0.23 | 0.15 | 0.10 | 0.06 | 0.15 | 0.15 | 0.15 | 0.15 | 0.15 | 0.15 | 0.15 | 0.15 |
| W21, W31 (mm) | 15 | 5.0 | 5.0 | 5.0 | 5.0 | 5.0 | 5.0 | 5.0 | 3.8 | 2.5 | 1.6 | 2.5 | 2.5 | 2.5 | 2.5 | 2.5 |
| θ21, θ31 (deg) | 75 | 75 | 75 | 75 | 75 | 75 | 75 | 75 | 75 | 75 | 75 | 75 | 75 | 75 | 75 | 75 |
| GROOVE BOTTOM SIPE | NONE | NONE | NONE | NONE | NONE | NONE | NONE | NONE | NONE | NONE | NONE | YES | YES | YES | YES | YES |
| GROOVE BOTTOM SIPE (mm) | - | - | - | - | - | - | - | - | - | - | - | 1.0 | 1.0 | 1.0 | 1.0 | 1.0 |
| H23/Hg1, H33/Hg2 | - | - | - | - | - | - | - | - | - | - | - | 0.95 | 0.45 | 0.21 | 0.45 | 0.45 |
| H23'/Hg1, H33'/Hg2 | - | - | - | - | - | - | - | - | - | - | - | 0.80 | 0.30 | 0.06 | 0.30 | 0.30 |
| A2, A3 (mm) | 2.0 | 2.0 | 2.0 | 2.0 | 2.0 | 2.0 | 2.0 | 2.0 | 2.0 | 2.0 | 2.0 | 2.0 | 2.0 | 2.0 | - | 2.0 |
| λ2/Lt, λ3/Lt | 0.66 | 0.16 | 0.20 | 0.26 | 0.20 | 0.20 | 0.20 | 0.20 | 0.20 | 0.20 | 0.20 | 0.20 | 0.20 | 0.20 | - | 0.20 |
| ACCELERATION PERFORMANCE ON SNOW | 100 | 150 | 140 | 130 | 142 | 140 | 140 | 135 | 141 | 140 | 138 | 152 | 155 | 147 | 150 | 155 |
| LOW ROLLING RESISTANCE PERFORMANCE | 100 | 102 | 103 | 105 | 107 | 108 | 108 | 109 | 109 | 111 | 112 | 110 | 111 | 111 | 111 | 111 |

FIG. 24

| SHAPE OF NARROW SHALLOW GROOVE | COMPARATIVE EXAMPLE | EXAMPLE 16 | EXAMPLE 17 | EXAMPLE 18 | EXAMPLE 19 | EXAMPLE 20 | EXAMPLE 21 | EXAMPLE 22 | EXAMPLE 23 | EXAMPLE 24 | EXAMPLE 25 | EXAMPLE 26 |
|---|---|---|---|---|---|---|---|---|---|---|---|---|
| | FIG. 20 | FIG. 3 | FIG. 3 | FIG. 3 | FIG. 3 | FIG. 3 | FIG. 3 | FIG. 3 | FIG. 3 | FIG. 3 | FIG. 3 | FIG. 3 |
| Wn (mm) | 6.0 | 6.0 | 4.0 | 0.8 | 0.8 | 0.8 | 0.8 | 0.8 | 0.8 | 0.8 | 0.8 | 0.8 |
| Hn/Hg1 | 0.40 | 0.40 | 0.20 | 0.20 | 0.20 | 0.20 | 0.20 | 0.20 | 0.20 | 0.20 | 0.20 | 0.20 |
| W11/Wb1 | 1.00 | 0.55 | 0.55 | 0.55 | 0.60 | 0.75 | 0.75 | 0.75 | 0.75 | 0.75 | 0.75 | 0.75 |
| L11/P11 | - | 0.50 | 0.50 | 0.50 | 0.50 | 0.50 | 0.60 | 0.65 | 0.65 | 0.65 | 0.65 | 0.65 |
| D1/P11 | - | 0.50 | 0.50 | 0.50 | 0.50 | 0.50 | 0.50 | 0.50 | 0.50 | 0.50 | 0.50 | 0.50 |
| D2/Wb1 | - | 0 | 0 | 0 | 0 | 0 | 0 | 0 | 0 | 0 | 0 | 0 |
| θ11 (deg) | - | 90 | 90 | 90 | 90 | 90 | 80 | 75 | 75 | 75 | 75 | 75 |
| ΣLa/W11 | (2.00) | 1.20 | 1.20 | 1.20 | 1.20 | 1.20 | 1.20 | 1.20 | 1.40 | 1.60 | 1.60 | 1.60 |
| Lb/L11 | - | 0.50 | 0.50 | 0.50 | 0.50 | 0.50 | 0.50 | 0.50 | 0.50 | 0.50 | 0.65 | 0.75 |
| ACCELERATION PERFORMANCE ON SNOW | 100 | 96 | 96 | 96 | 98 | 101 | 102 | 102 | 103 | 104 | 105 | 106 |
| PASS-BY NOISE PERFORMANCE (dB DIFFERENCE) | 0 | -0.1 | -0.2 | -0.3 | -0.3 | -0.3 | -0.3 | -0.4 | -0.4 | -0.4 | -0.4 | -0.4 |

FIG. 25

CONVENTIONAL EXAMPLE

TIRE

CROSS-REFERENCE TO RELATED APPLICATIONS

This application priority pursuant to 35 U.S.C. 119(a) of Japanese Patent Application No. 2020-064451, filed Mar. 31, 2020, and Japanese Patent Application No. 2020-064583, filed Mar. 31, 2020, which applications are incorporated herein by reference in the entirety.

TECHNICAL FIELD

The technology relates to a tire, and particularly relates to a tire that can achieve acceleration performance on snow and low rolling resistance performance in a compatible manner.

BACKGROUND ART

In conventional heavy duty tires, a zigzag shaped main groove is employed to increase the acceleration performance on snow of a tire. The technology described in Japan Unexamined Patent Publication No. 2017-154708 is a known conventional tire employing this configuration.

On the other hand, in heavy duty tires mounted on the steering axle of a vehicle, there is a problem that the rolling resistance of the tire should be reduced.

SUMMARY

A tire according to an embodiment of the technology includes a plurality of main grooves extending in a tire circumferential direction and four or more rows of land portions defined by the main grooves, at least one row of the land portions including a plurality of through lug grooves that pass through the land portion in a tire width direction, and a pitch length of the through lug grooves being in a range of from 7% or greater to 14% or less of a tire maximum ground contact length, and a maximum groove depth of the through lug grooves being in a range of from 5% or greater to 65% or less of a maximum groove depth of the main grooves.

In the tire according to an embodiment of the technology, there is an advantage that the relationship between the pitch length and the maximum groove depth of the through lug grooves is made appropriate and the acceleration performance on snow and the low rolling resistance performance of the tire are achieved in a compatible manner. Specifically, the range of the pitch lengths of the through lug groove has the lower limit, and the range of the maximum groove depths of the through lug groove has the upper limit. As a result, the rigidity of the land portion is ensured and degradation in the rolling resistance of the tire is suppressed. Additionally, the range of the pitch lengths of the through lug groove has the upper limit, and the range of the maximum groove depths of the through lug groove has the lower limit. As a result, the edge component of the land portion is ensured, and the traction action of the through lug grooves during traveling on snowy road surfaces is ensured.

BRIEF DESCRIPTION OF DRAWINGS

FIG. 24 is a table showing the results of performance tests of the tires according to embodiments of the technology.

FIG. 25 is a table showing the results of performance tests of tires according to embodiments of the technology.

DETAILED DESCRIPTION

Embodiments of the technology are described in detail below with reference to the drawings. However, the technology is not limited to these embodiments. Moreover, constituents of the embodiments include elements that are substitutable while maintaining consistency with the technology, and obviously substitutable elements. Furthermore, the modified examples described in the embodiments can be combined as desired within the scope apparent to one skilled in the art.

Tire

Figure 1:
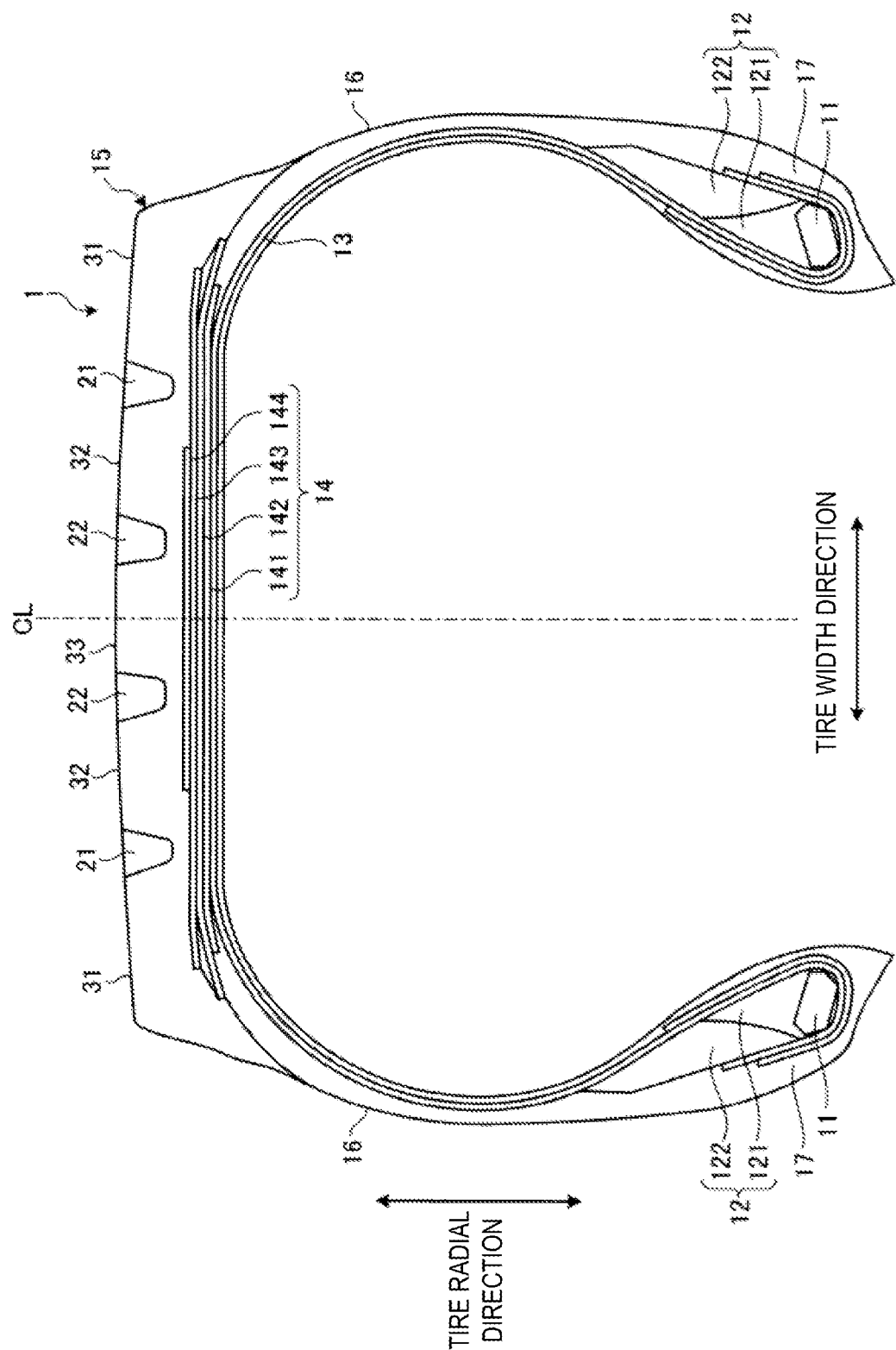
FIG. 1 is a cross-sectional view in a tire meridian direction illustrating a tire according to an embodiment of the technology.

FIG. 1 is a cross-sectional view in a tire meridian direction illustrating a tire according to an embodiment of the technology. The identical drawing illustrates a cross-sectional view of a half region in the tire radial direction. In this embodiment, a heavy duty pneumatic radial tire mounted on a steering axle of trucks and tractors will be described as an example of the tire.

In reference to the same drawing, "cross section in a tire meridian direction" refers to a cross section of the tire taken along a plane that includes the tire rotation axis (not illustrated). Reference sign CL denotes a tire equatorial plane and refers to a plane normal to the tire rotation axis that passes through the center point of the tire in a tire rotation axis direction. "Tire width direction" refers to the direction parallel with the tire rotation axis. "Tire radial direction" refers to the direction perpendicular to the tire rotation axis.

A tire 1 has an annular structure with the tire rotation axis as its center and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 include one or a plurality of bead wires made of steel and wound annularly multiple times and are embedded in bead portions to configure cores of the left and right bead portions. The pair of bead fillers 12, 12 are respectively disposed on an outer circumference of the pair of bead cores 11, 11 in the tire radial direction and reinforce the bead portions.

The carcass layer 13 has a single layer structure made of one carcass ply or a multilayer structure made of a plurality of carcass plies being layered and extends between the left and right bead cores 11, 11 in a toroidal shape, forming the framework of the tire. Additionally, both end portions of the carcass layer 13 are turned back an outer side in the tire width direction so as to wrap around the bead cores 11 and the bead fillers 12 and fixed. Additionally, the carcass ply of the carcass layer 13 is formed by rolling a plurality of coating-rubber-covered carcass cords made from steel or an organic fiber material (for example, aramid, nylon, polyester, rayon, or the like) and has a carcass angle (defined as the inclination angle in the longitudinal direction of the carcass cords with respect to the tire circumferential direction) ranging from 80° or greater to 100° or less in an absolute value.

The belt layer 14 is formed by stacking four layers of belt plies 141 to 144 and is disposed by being wound around the outer circumference of the carcass layer 13. The belt plies 141 to 144 are formed by rolling a plurality of coating-rubber-covered belt cords made from steel or an organic fiber material and has a belt angle ranging from 15° or greater to 55° or less in an absolute value. Additionally, the belt plies 141 to 144 have belt angles (defined as the inclination angle in the longitudinal direction of the belt cords with respect to the tire circumferential direction) of opposite signs and are stacked so that the longitudinal directions of the belt cords intersect each other (a so-called crossply structure).

The tread rubber 15 is disposed on an outer circumference in the tire radial direction of the carcass layer 13 and the belt layer 14 and constitutes a tread portion of the tire 1. The pair of sidewall rubbers 16, 16 are disposed on the outer side in the tire width direction of the carcass layer 13 and constitute left and right sidewall portions. The pair of rim cushion rubbers 17, 17 extend from an inner side in the tire radial direction of the left and right bead cores 11, 11 and turned back portions of the carcass layer 13 in an outer side in the tire width direction to constitute rim fitting surfaces of the bead portions.

Tread Pattern

Figure 2:
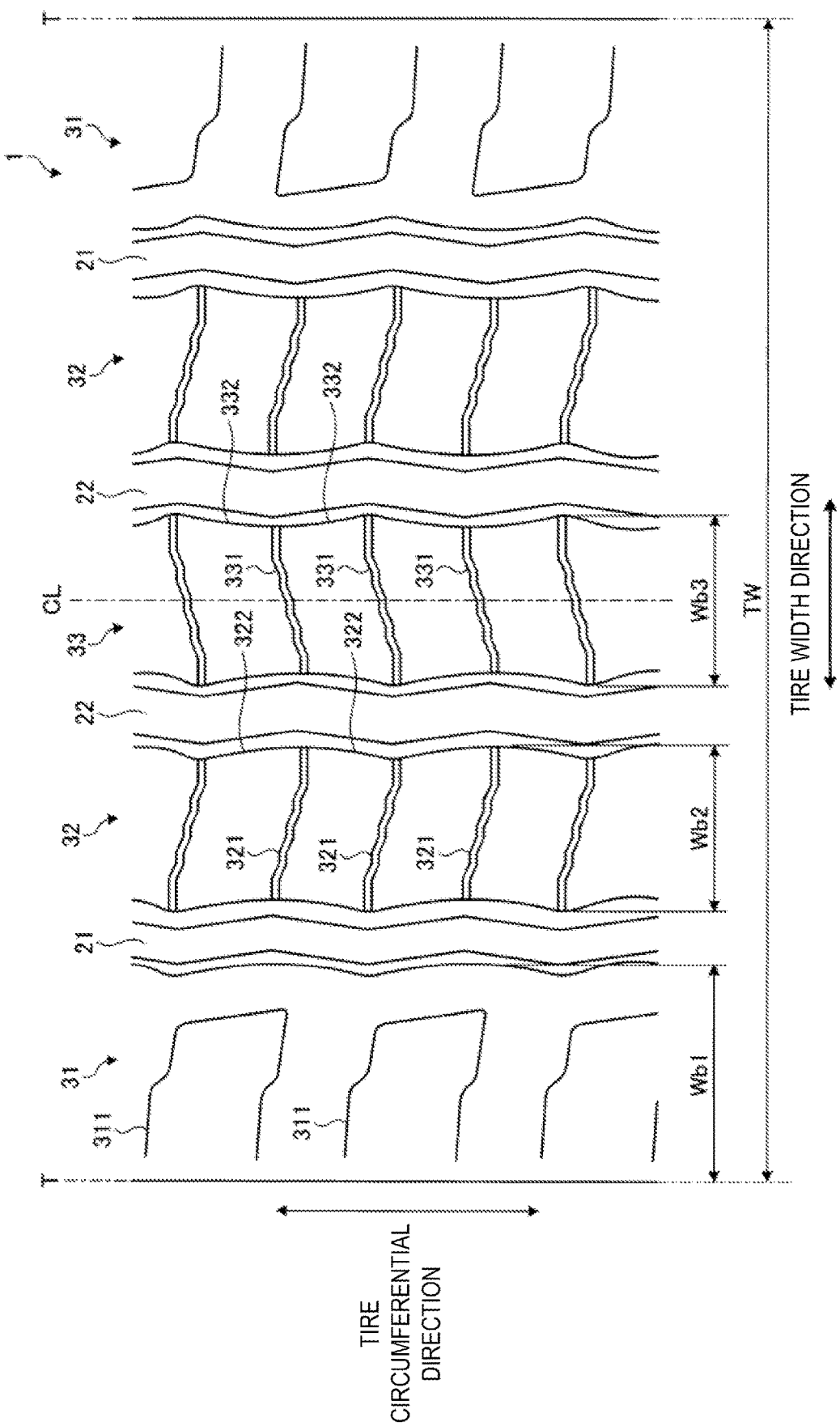
FIG. 2 is a plan view illustrating a tread surface of the tire illustrated in FIG. 1.

FIG. 2 is a plan view illustrating a tread surface of the tire 1 illustrated in FIG. 1. The same drawing illustrates a tread surface of an all-season tire having the mud-and-snow mark "M+S". In reference to the same drawing, "tire circumferential direction" refers to the direction revolving about the tire rotation axis. Reference sign T denotes a tire ground contact edge, and a dimension symbol TW denotes a tire ground contact width.

As illustrated in FIG. 2, the tire 1 includes a plurality of circumferential main grooves 21, 22 extending in the tire circumferential direction and a plurality of land portions 31, 32, 33 defined in the circumferential main grooves 21, 22, the plurality of circumferential main grooves 21, 22 and the plurality of land portions 31, 32, 33 being provided in a tread surface.

"Main groove" refers to a groove on which a wear indicator must be provided as specified by JATMA (The Japan Automobile Tyre Manufacturers Association, Inc.) and has a maximum groove width of 7.0 mm or greater and a maximum groove depth of 12 mm or greater.

The groove width is measured as a distance between left and right groove walls at a groove opening portion when the tire is mounted on a specified rim, inflated to a specified internal pressure, and in an unloaded state. In a configuration in which the land portion includes a notch portion or a chamfered portion on an edge portion thereof, the groove width is measured with intersection points between the tread contact surface and extension lines of the groove walls as measurement points, in a cross-sectional view with the groove length direction as a normal line direction.

The groove depth is the distance from the tread contact surface to the groove bottom and is measured when the tire is mounted on a specified rim, inflated to the specified internal pressure, and in an unloaded state. Additionally, in a configuration in which the grooves include an uneven portion or sipes on the groove bottom, the groove depth is measured excluding these portions.

"Specified rim" refers to a "standard rim" defined by JATMA, a "Design Rim" defined by TRA (The Tire and Rim Association, Inc.), or a "Measuring Rim" defined by ETRTO (The European Tyre and Rim Technical Organisation). Additionally, "specified internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in JATMA, in a case of a tire for a passenger vehicle, the specified internal pressure is an air pressure of 180 kPa, and the specified load is 88% of the maximum load capacity at the specified internal pressure.

For example, in the configuration of FIG. 2, the tire 1 has an approximately point symmetric tread pattern having a center point on the tire equatorial plane CL. However, no such limitation is intended, and, for example, the tire 1 may have a left-right axisymmetric tread pattern or a left-right asymmetric tread pattern about the tire equatorial plane CL and may have a tread pattern having directionality in the tire rotation direction (not illustrated).

Furthermore, in the configuration of FIG. 2, left and right regions demarcated by the tire equatorial plane CL each have the two circumferential main grooves 21, 22. These circumferential main grooves 21, 22 are disposed being left-right symmetric with respect to the tire equatorial plane CL. Five rows of the land portions 31 to 33 are defined by these circumferential main grooves 21, 22. In addition, one land portion 33 is disposed on the tire equatorial plane CL.

However, no such limitation is intended, and three, or five or more circumferential main grooves may be disposed, or the circumferential main grooves may be arranged asymmetrically with respect to the tire equatorial plane CL (not illustrated). In addition, the land portion may be arranged at a position away from the tire equatorial plane CL, with one circumferential main groove being arranged on the tire equatorial plane CL (not illustrated).

Additionally, of the circumferential main grooves 21, 22 disposed in one region demarcated by the tire equatorial plane CL, the circumferential main groove 21 on the outermost side in the tire width direction is defined as a shoulder main groove, and the circumferential main groove 22 on the tire equatorial plane CL side is defined as a center main groove.

The land portion 31 located on the outer side in the tire width direction defined in the shoulder main groove 21 is defined as a shoulder land portion. The shoulder land portion 31 is a land portion located on the outermost side in the tire width direction and on the tire ground contact edge T. Furthermore, the land portion 32 located on the inner side in the tire width direction defined in the shoulder main groove 21 is defined as a middle land portion. The middle land portion 32 is adjacent to the shoulder land portion 31 with the shoulder main groove 21 disposed therebetween. Furthermore, the land portion 33 located closer to the tire equatorial plane CL side than the middle land portion 32 is defined as a center land portion. The center land portion 33 may be disposed on the tire equatorial plane CL (see FIG. 2) or may be arranged at a position away from the tire equatorial plane CL (not illustrated).

The tire ground contact width TW is measured as the maximum linear distance in the tire axial direction of a contact surface between the tire and a flat plate when the tire is mounted on a specified rim, inflated to the specified internal pressure, placed perpendicular to the flat plate in a static state, and loaded with a load corresponding to the specified load.

The tire ground contact edge T is defined as the maximum width position in the tire axial direction of the contact surface between the tire and a flat plate when the tire is mounted on a specified rim, inflated to the specified internal pressure, placed perpendicular to the flat plate in a static state, and loaded with a load corresponding to the specified load.

Note that, in a configuration including four circumferential main grooves 21, 22 as illustrated in FIG. 2, a pair of shoulder land portions 31, 31, a pair of middle land portions 32, 32, and a single center land portion 33 are defined. Additionally, for example, in a configuration including five or more circumferential main grooves, two or more rows of center land portions are defined (not illustrated). In a configuration including three circumferential main grooves, the middle land portion also serves as the center land portion (not illustrated).

In the configuration of FIG. 2, a maximum ground contact width Wb1 of the shoulder land portion 31 has a relationship of $0.15 \leq Wb1/TW \leq 0.25$ with respect to a tire ground contact width TW. Additionally, a maximum ground contact width Wb3 of the center land portion 33 closest to the tire equatorial plane CL preferably has a relationship of $0.15 \leq Wb3/TW \leq 0.25$ with respect to the tire ground contact width TW, and more preferably has a relationship of $0.18 \leq Wb3/TW \leq 0.23$. Additionally, in a configuration including four circumferential main grooves 21, 22 and five rows of land portions 31 to 33 as illustrated in FIG. 2, a maximum ground contact width Wb2 of the middle land portion 32 is preferably slightly narrower than the maximum ground contact width Wb1 of the shoulder land portion 31, and specifically, is preferably in a range $0.85 \leq Wb2/Wb1 \leq 0.95$.

In the configuration of FIG. 2, the shoulder main groove 21 and the center main groove 22 have a zigzag shape or a wave-like shape having an amplitude in the tire width direction. However, no such limitation is intended, and as described below, the shoulder main grooves 21 and the center main grooves 22 may have a straight shape at the groove opening portion (not illustrated).

The shoulder land portion 31 is a rib having a road contact surface continuous in the tire circumferential direction, and does not include lug grooves. In addition, the middle land portion 32 and the center land portion 33 each include a plurality of through lug grooves 321, 331. The through lug grooves 321, 331 have an open structure that passes through the land portions 32, 33 and are arranged at predetermined intervals in the tire circumferential direction. As a result, the middle land portion 32 and the center land portion 33 are divided in the tire circumferential direction by the through lug grooves 321, 331 to form a row of blocks.

In FIG. 2, a snow traction index STI in the tire circumferential direction on the entire circumference of the tire 1 (so-called 0-degree snow traction index) is in a range of $130 \leq STI$.

The snow traction index STI is an empirical formula by Uniroyal company proposed by the Society of Automotive Engineers (SAE) and is defined by the following Mathematical Formula (1). In the Formula, Pg is a groove density (1/mm) and is calculated as a ratio between the groove length (mm) of all the grooves (all grooves except sipes) projected in the tire circumferential direction on the tire ground contact surface and the tire ground contact area (product of the tire ground contact width and tire circumferential length) (mm^2). In addition, ρs is a sipe density (1/mm) and is calculated as the ratio between the sipe length (mm) of all the sipes projected in the tire circumferential direction on the tire ground contact surface and the tire ground contact area (mm^2). Furthermore, Dg is an average value of the groove depth (mm) of all the grooves projected in the tire circumferential direction on the tire ground contact surface.

$$STI=-6.8+2202 \times Pg+672 \times \rho s+7.6 \times Dg \quad (1)$$

Middle Land Portion

Figure 3:
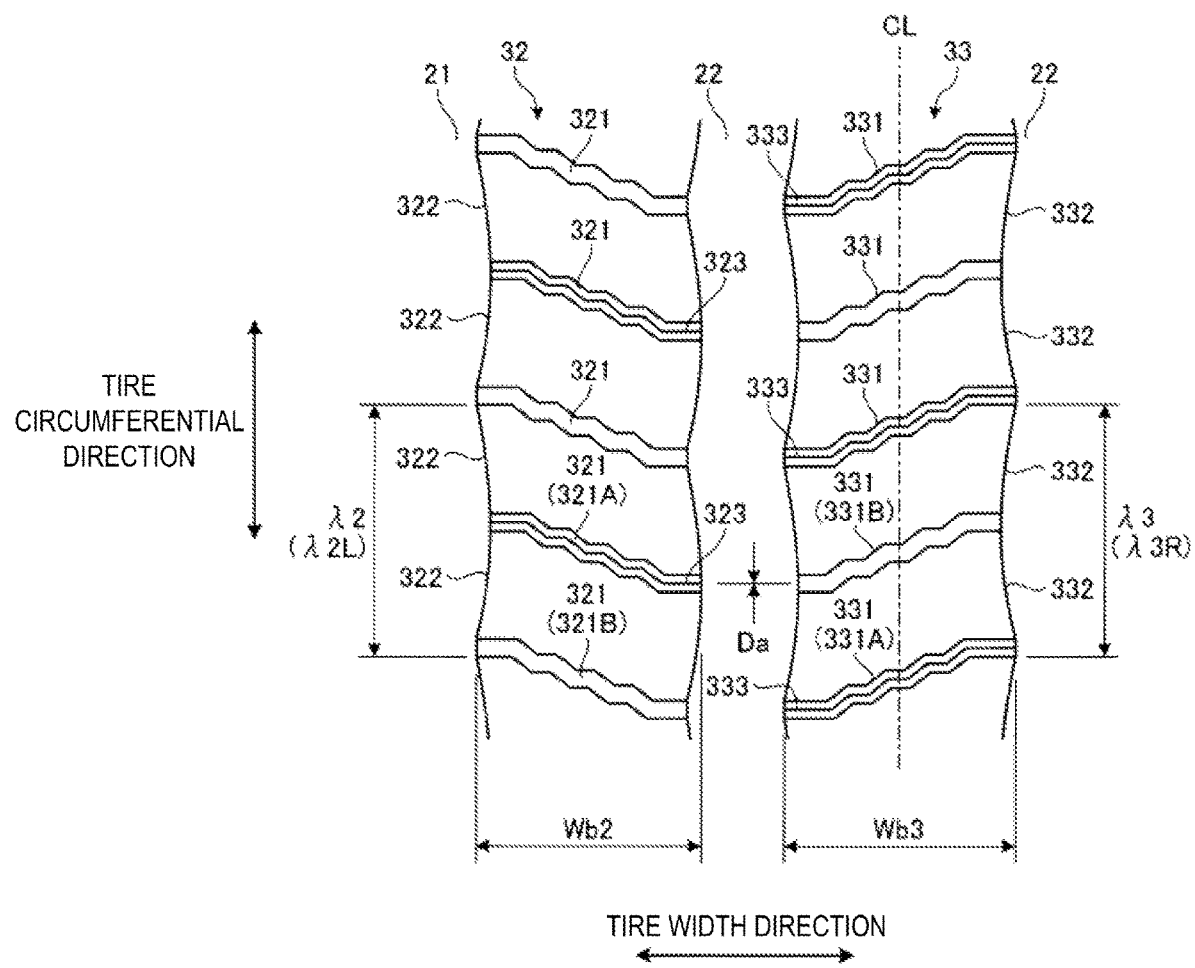
FIG. 3 is an enlarged view illustrating a middle land portion and a center land portion of the tire illustrated in FIG. 2.
Figure 4:
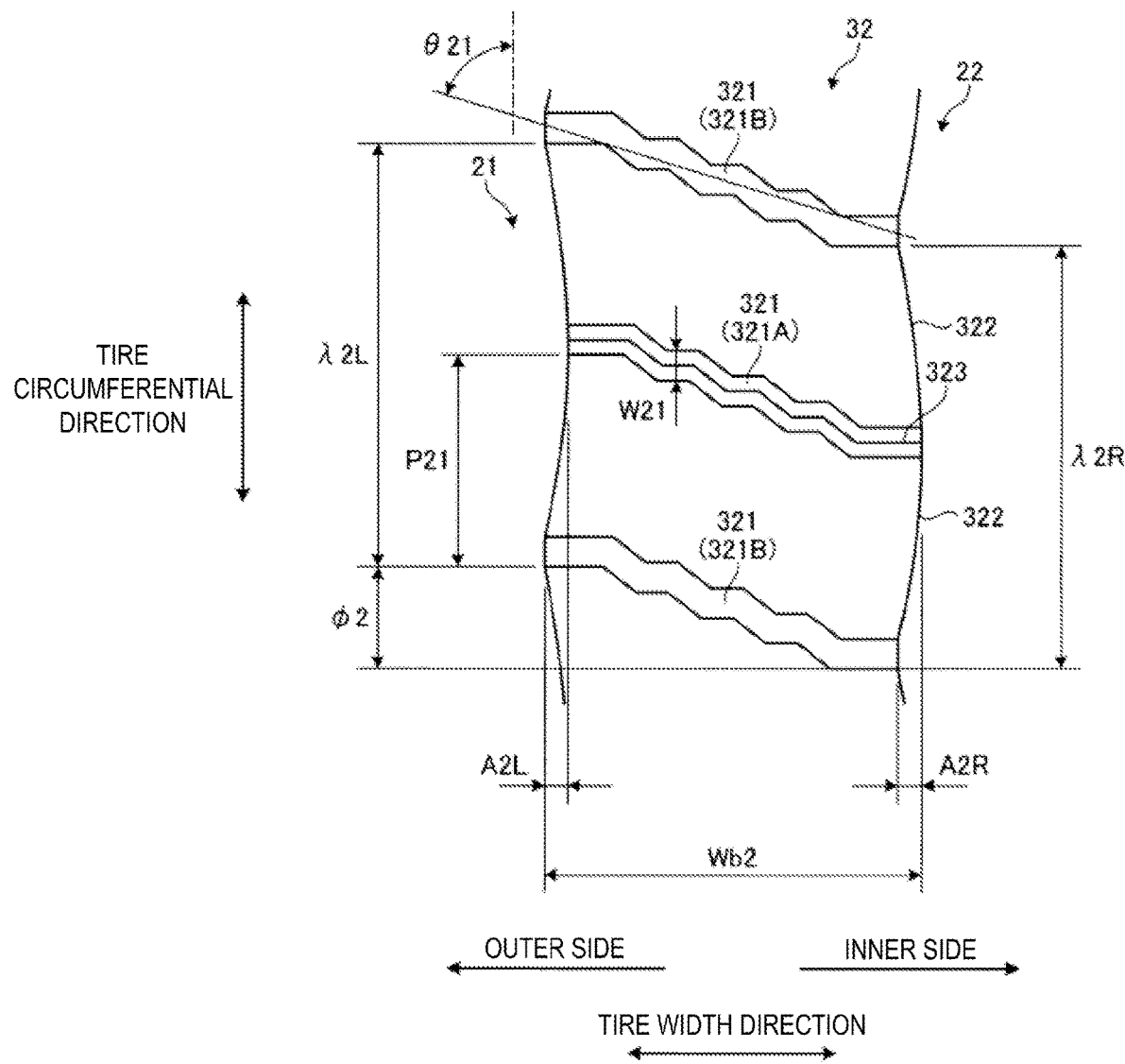
FIG. 4 is an enlarged view illustrating the middle land portion illustrated in FIG. 3.
Figure 5:
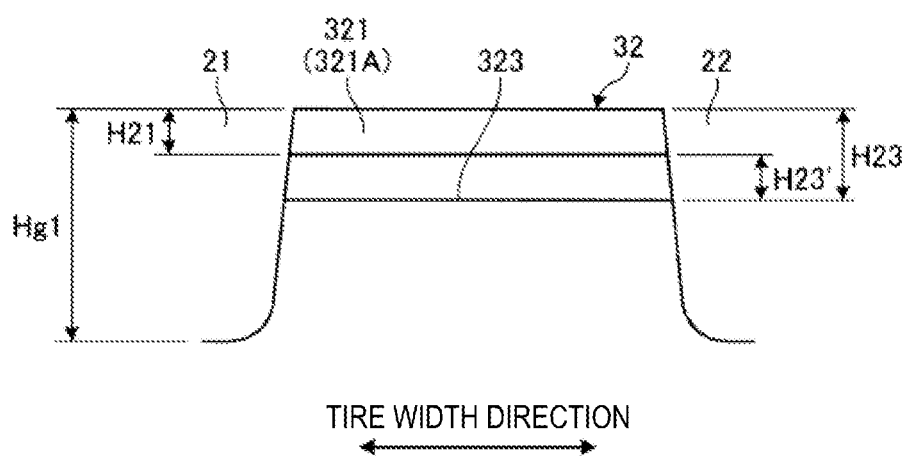
FIG. 5 is a cross-sectional view of the middle land portion illustrated in FIG. 3.
Figure 6:
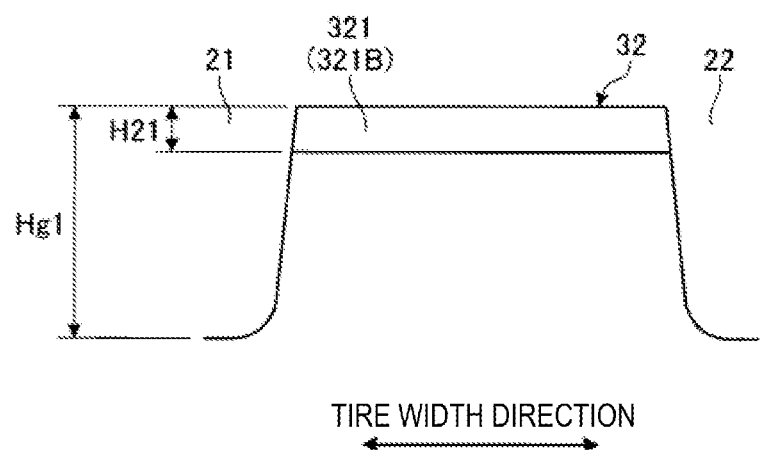
FIG. 6 is a cross-sectional view of the middle land portion illustrated in FIG. 3.

FIG. 3 is an enlarged view illustrating the middle land portion 32 and the center land portion 33 of the tire 1 illustrated in FIG. 2. FIG. 4 is an enlarged view illustrating the middle land portion 32 illustrated in FIG. 3. FIGS. 5 and 6 are cross-sectional views of the middle land portion 32 illustrated in FIG. 3. In these drawings, FIG. 5 illustrates a cross-sectional view of the middle land portion 32 taken along a through lug groove 321A having a groove bottom sipe 323, and FIG. 6 illustrates a cross-sectional view of the middle land portion 32 taken along a through lug groove 321B not having a groove bottom sipe.

In the configuration of FIG. 2, as illustrated in FIG. 3, the groove opening portions of the shoulder main grooves 21 and the center main grooves 22 have a wave-like shape formed by connecting a plurality of arcs that project toward the tire equatorial plane CL. As a result, the left and right edge portions of the middle land portion 32 have a wave-like shape formed by connecting a plurality of arcs that project toward the tire equatorial plane CL.

Additionally, in FIG. 4, the wavelengths λ2L, λ2R of the wave-like shapes of the edge portions of the middle land portion 32 are in a range of from 14% or greater to 28% or less of the tire maximum ground contact length Lt (not illustrated). In addition, the wave-like shape wavelengths λ2L, λ2R of the left and right edge portions are set to be equal to each other.

The tire maximum ground contact length Lt is measured as the maximum linear distance in the tire circumferential direction of a contact surface between the tire and a flat plate when the tire is mounted on a specified rim, inflated to a specified internal pressure, placed perpendicular to the flat plate in a static state, and loaded with a load corresponding to the specified load.

As illustrated in FIG. 4, the circumferential length of the arc (dimension symbol omitted in drawings) is 80% or greater, and preferably 85% or greater with respect to the wavelengths λ2L, λ2R of the wave-like shape. Additionally, adjacent arcs are connected via short straight lines or arcs. Accordingly, the edge portion of the middle land portion 32 has a wave-like shape formed by connecting long arcs that project in the same direction. In such a configuration, uneven wear at the maximum projection position of the edge portion is suppressed as compared to a configuration in which the edge portion has a zigzag shape or a sinusoidal shape.

Additionally, the amplitudes A2L, A2R of the wave-like shapes of the edge portions are in a range of from 3.0% or greater to 10% or less, and preferably in a range of from 4.0% or greater to 7.0% or less with respect to the maximum ground contact width Wb2 of the middle land portion 32. Additionally, the amplitudes A2L, A2R are in a range of from 1.0 mm or greater to 15.0 mm or less, and is preferably in a range of from 1.2 mm or greater to 10.0 mm or less. Furthermore, the ratio of the amplitudes A2L, A2R of the wave-like shapes of the left and right edge portions is set to be in a range of from 90% or greater to 110% or less.

Furthermore, the phase $2 of the wave-like shapes of the left and right edge portions is in a range of from 10% or greater to 40% or less with respect to the wavelength λ2L.

The wavelength, the amplitude, and the phase of the wave-like shapes of the edge portions of the land portion are measured when the tire is mounted on a specified rim, inflated to a specified internal pressure, and in an unloaded state.

As illustrated in FIG. 3, the middle land portion 32 includes a plurality of through lug grooves 321 and a plurality of blocks 322.

The through lug grooves 321 have an open structure that passes through the middle land portion 32 in the tire width direction. Additionally, the plurality of the through lug grooves 321 are arranged at a predetermined pitch length P21 in the tire circumferential direction. In addition, the pitch length P21 of the through lug grooves 321 is in a range of from 7% or greater to 14% or less of the tire maximum ground contact length Lt (not illustrated). For example, in the configuration of FIG. 3, the through lug grooves 321 are respectively open to the maximum amplitude positions of the wave-like shapes of the left and right edge portions of the middle land portion 32. Additionally, the pitch number of the through lug grooves 321 is set to be twice the pitch number of the wave-like shapes of the edge portions. Additionally, the pitch number of the through lug grooves 321 in the entire circumference of the tire is in a range of from 100 or greater to 200 or less.

In FIG. 4, the through lug grooves 321 of the middle land portion 32 are narrow shallow grooves and have a maximum groove width W21 of from 1.5 mm or greater to 4.0 mm or less (preferably 3.0 mm or less), and a maximum groove depth H21 of from 1.5 mm or greater to 4.0 mm or less (preferably 3.0 mm or less) (see FIG. 5). Further, in FIG. 5, a maximum groove depth H21 of the through lug groove 321 has a relationship of $0.05 \leq H21/Hg1 \leq 0.65$, and preferably a relationship of $0.10 \leq H21/Hg1 \leq 0.30$ with respect to the maximum groove depth Hg1 of the shoulder main groove 21.

In the configuration described above, the relationship between the pitch length P21 and the maximum groove depth H21 of the through lug grooves 321 is made appropriate, and the acceleration performance on snow and low rolling resistance performance of the tire are achieved in a compatible manner. Specifically, the range of the pitch length P21 of the through lug grooves 321 has the lower limit, and the range of the maximum groove depth H21 of the through lug grooves 321 has the upper limit. As a result, the rigidity of the middle land portion 32 is ensured and degradation in the rolling resistance of the tire is suppressed. Additionally, the range of the pitch length P21 of the through lug grooves 321 has the upper limit, and the range of the maximum groove depth H21 of the through lug grooves 321 has the lower limit. As a result, the edge component of the middle land portion 32 is ensured, and the traction action of the through lug grooves 321 during traveling on snowy road surfaces is ensured.

In FIG. 4, an inclination angle θ21 of the through lug grooves 321 with respect to the tire circumferential direction is in a range of $60° \leq \theta 21 \leq 120°$. In the configuration of FIG. 4, the wave-like shapes of the left and right edge portions of the middle land portion 32 are disposed so as to be out of phase from each other, and the through lug grooves 321 are respectively open to the maximum amplitude positions of the wave-like shapes of the left and right edge portions. As a result, the entire through lug grooves 321 are inclined with respect to the tire circumferential direction.

The inclination angle θ21 of the through lug groove 321 is measured as an angle formed between an imaginary straight line connecting both end portions of the through lug groove 321 and the tire circumferential direction.

As illustrated in FIG. 4, the through lug grooves 321 have a zigzag shape. In addition, the amplitude of the zigzag shape of the through lug groove 321 is in a range of from 2.0% or greater to 7.0% or less with respect to the pitch length P21 of the through lug groove 321. In addition, the wavelength of the zigzag shape of the through lug groove 321 is in a range of from 16% or greater to 22% or less with respect to the maximum ground contact width Wb2 of the middle land portion 32.

Additionally, as illustrated in FIGS. 3 to 6, the plurality of through lug grooves 321 includes a first through lug groove 321A (see FIG. 5) having a groove bottom sipe 323 and a second through lug groove 321B not having a groove bottom sipe (see FIG. 6). As illustrated in FIG. 6, the second through lug groove 321B has a structure in which the groove bottom sipe 323 is omitted from the first through lug groove 321A in FIG. 5. In addition, in the configuration of FIG. 3, the first through lug groove 321A and the second through lug groove 321B are disposed alternately in the tire circumferential direction. However, no such limitation is intended, and two or three second through lug grooves 321B may be disposed between adjacent first through lug grooves 321A, 321A (not illustrated).

The groove bottom sipe is a cut formed in a groove bottom of the lug groove and has a maximum sipe width of less than 1.0 mm and a sipe depth described later and is closed when the tire comes into contact with the ground.

The distance H23' from the groove bottom of the through lug groove 321 to the maximum depth position of the groove bottom sipe 323 is in a range of 0.06≤H23'/Hg1, and preferably in a range of 0.10≤H23'/Hg1 with respect to the maximum groove depth Hg1 of the shoulder main grooves 21. Additionally, the distance H23 from the tread contact surface to the maximum depth position of the groove bottom sipe 323 is in a range of H23/Hg1≤1.00, and preferably in a range of H23/Hg1≤0.50 with respect to the maximum groove depth Hg1 of the shoulder main grooves 21.

The block 322 is defined by the plurality of through lug grooves 321. Additionally, the block 322 has a shape that is long in the tire width direction. Specifically, in FIG. 4, the pitch length of the block 322 (equal to the pitch length P21 of the through lug grooves 321) is in a range of from 45% or greater to 80% or less, and preferably in a range of from 50% or greater to 75% or less with respect to the maximum ground contact width Wb2 of the middle land portion 32.

Center Land Portion

Figure 7:
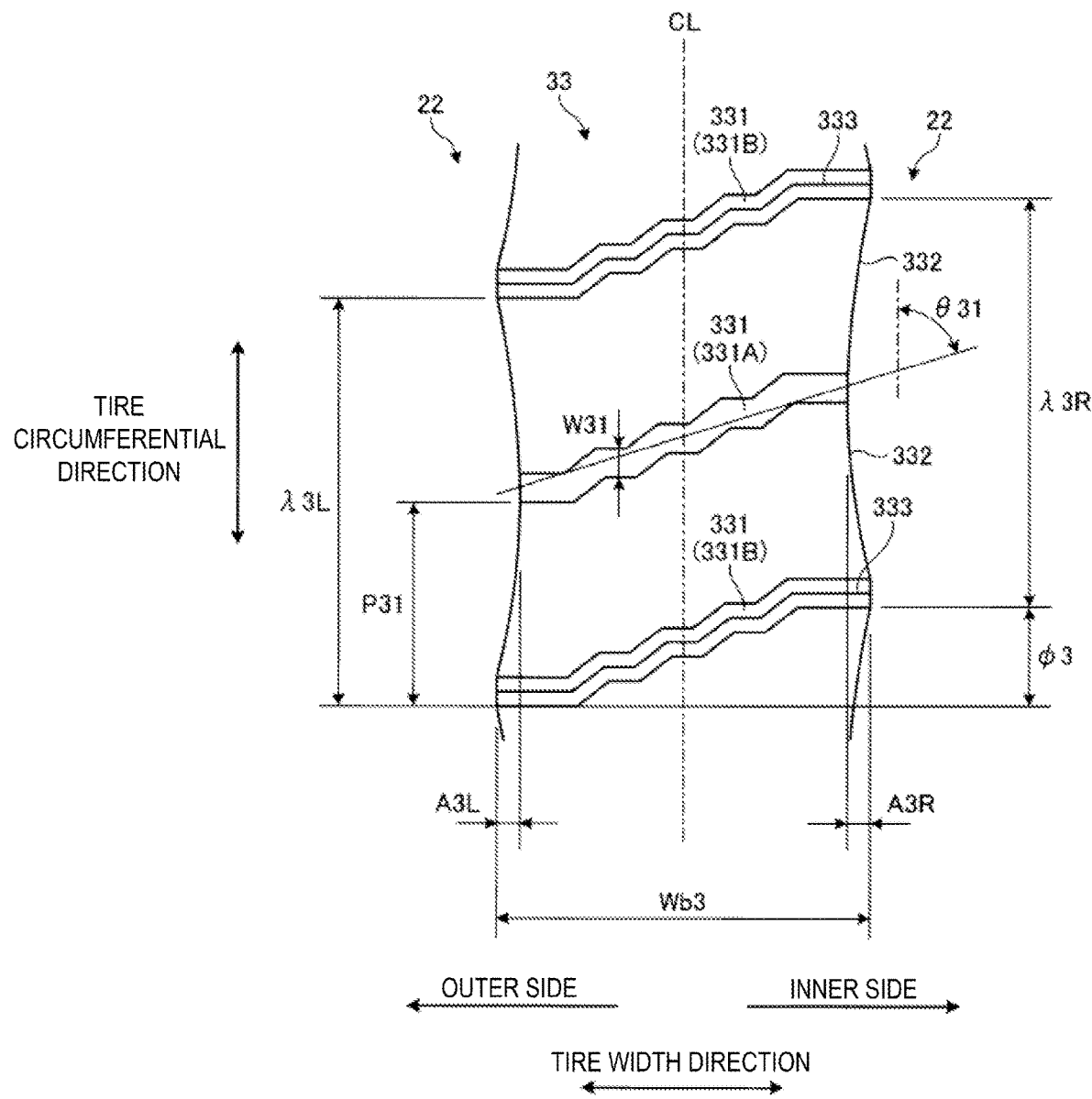
FIG. 7 is an enlarged view illustrating the center land portion illustrated in FIG. 3.

FIG. 7 is an enlarged view illustrating the center land portion 33 illustrated in FIG. 3. In the same drawing, constituents that are the same as the constituents illustrated in FIG. 3 are denoted by the same reference signs, and explanations thereof are omitted.

In the configuration of FIG. 2, as illustrated in FIG. 3, the groove opening portions of the left and right center main grooves 22, 22 have a wave-like shape formed by connecting a plurality of arcs that project toward the tire equatorial plane CL. As a result, the left and right edge portions of the center land portion 33 have a wave-like shape formed by connecting a plurality of arcs that project toward the tire equatorial plane CL (in the same drawing, toward the inner side in the width direction of the center land portion 33).

Additionally, in FIG. 7, the wavelengths λ3L, λ3R of the wave-like shapes of the edge portions of the center land portion 33 are in a range of from 14% or greater to 28% or less of the tire maximum ground contact length Lt (not illustrated). In addition, the wavelengths λ3L, λ3R of the wave-like shapes of the left and right edge portions are set to be equal to each other. The wavelength λ3L of the edge portion of the center land portion 33 defined by the center main grooves 22 is set to be in a range of from 90% or greater to 110% or less with respect to the wavelength λ2R of the edge portion of the middle land portion 32 (see FIG. 4).

As illustrated in FIG. 7, the circumferential length of the arc (dimension symbol omitted in drawings) is 80% or greater, and preferably 85% or greater with respect to the wavelengths λ3L, λ3R of the wave-like shapes. Additionally, adjacent arcs are connected via short straight lines or arcs. Accordingly, the edge portion of the center land portion 33 has a wave-like shape formed by connecting long arcs that project in the same direction. In such a configuration, uneven wear at the maximum projection position of the edge portion is suppressed as compared to a configuration in which the edge portion has a zigzag shape or a sinusoidal shape.

Additionally, the amplitudes A3L, A3R of the wave-like shapes of the edge portions are in a range of from 3.0% or greater to 10% or less, and preferably in a range of from 4.0% or greater to 7.0% or less with respect to the maximum ground contact width Wb3 of the center land portion 33. Additionally, the amplitudes A3L, A3R are in a range of from 1.0 mm or greater to 15.0 mm or less, and preferably in a range of from 1.2 mm or greater to 10.0 mm or less. Furthermore, the ratio of the amplitudes A3L, A3R of the wave-like shapes of the left and right edge portions is set to be in a range of from 90% or greater to 110% or less. Additionally, the amplitude A3L of the edge portion of the center land portion 33 defined by the center main groove 22 is set to be in a range of from 90% or greater to 110% or less with respect to the amplitude A2R of the edge portion of the middle land portion 32 (see FIG. 4).

Furthermore, the phase φ3 of the wave-like shapes of the left and right edge portions is in a range of from 10% or greater to 40% or less with respect to the wavelength λ3L.

As illustrated in FIG. 3, the center land portion 33 includes a plurality of through lug grooves 331 and a plurality of blocks 332.

The through lug grooves 331 have an open structure that passes through the center land portion 33 in the tire width direction. Additionally, the plurality of through lug grooves 331 are arranged at a predetermined pitch length P31 in the tire circumferential direction. The pitch length P31 of the through lug grooves 331 is in a range of from 7% or greater to 14% or less of the tire maximum ground contact length Lt (not illustrated). For example, in the configuration of FIG. 3, the through lug grooves 331 are respectively open to the maximum amplitude positions of the wave-like shapes of the left and right edge portions of the center land portion 33. Additionally, the pitch number of the through lug grooves 331 is set to be twice the pitch number of the wave-like shapes of the edge portions. Additionally, the pitch number of the through lug grooves 331 in the entire circumference of the tire is in a range of from 100 or greater to 200 or less. Additionally, the pitch number of the through lug grooves 331 of the center land portion 33 is equal to the pitch number of the through lug grooves 321 of the middle land portion 32.

As illustrated in FIG. 3, the opening portions of the through lug grooves 331 of the center land portion 33 and the opening portions of the through lug grooves 321 of the middle land portion 32 with respect to the center main groove 22 are disposed so as to face each other. Specifically, the offset amount Da in the tire circumferential direction of the opening portions of the opposing through lug grooves 321, 331 is preferably in a range of 0≤Da/λ2≤0.10, and more preferably in a range of 0≤Da/λ2≤0.05 with respect to the wavelength λ2 of the edge portion of the middle land portion 32.

In FIG. 7, the through lug grooves 331 of the center land portion 33 are narrow shallow grooves and have a maximum groove width W31 of from 1.5 mm or greater to 4.0 mm or less (preferably 3.0 mm or less) and a maximum groove depth H31 (not illustrated) of from 1.5 mm or greater to 4.0 mm or less (preferably 3.0 mm or less). The maximum groove depth H31 of the through lug grooves 331 has a relationship of 0.05≤H31/Hg2≤0.65, and preferably a relationship of 0.10≤H31/Hg2≤0.30 with respect to the maximum groove depth Hg2 of the center main groove 22 (not illustrated).

In the configuration described above, the relationship between the pitch length P31 and the maximum groove depth H31 of the through lug grooves 331 is made appropriate, and there is an advantage that the acceleration performance on snow and the low rolling resistance performance of the tire are achieved in a compatible manner. Specifically, the range of the pitch length P31 of the through lug grooves 331 has the lower limit, and the range of the maximum groove depth H31 of the through lug grooves 331 has the upper limit. As a result, the rigidity of the center land portion 33 is ensured, and degradation in the rolling resistance of the tire is suppressed. Additionally, the range of the pitch length P31 of the through lug grooves 331 has the upper limit and the range of the maximum groove depth H31 of the through lug grooves 331 has the lower limit. As a result, the edge component of the center land portion 33 is ensured, and the traction action of the through lug grooves 331 during traveling on snowy road surfaces is ensured.

In FIG. 7, an inclination angle θ31 of the through lug grooves 331 with respect to the tire circumferential direction is in a range of $60° \leq \theta 31 \leq 120°$. In the configuration of FIG. 7, the wave-like shapes of the left and right edge portions of the center land portion 33 are disposed so as to be out of phase from each other, and the through lug grooves 331 are respectively open to the maximum amplitude positions of the wave-like shapes of the left and right edge portions. As a result, the entire through lug grooves 331 are inclined with respect to the tire circumferential direction. Additionally, as illustrated in FIG. 3, the inclination direction of the through lug grooves 331 of the center land portion 33 is opposite to the inclination direction of the through lug grooves 321 of the middle land portion 32.

As illustrated in FIG. 7, the through lug grooves 331 have a zigzag shape. In addition, the amplitude of the zigzag shapes of the through lug grooves 331 is in a range of from 2.0% or greater to 7.0% or less with respect to the pitch length P31 of the through lug grooves 331. In addition, the wavelength of the zigzag shapes of the through lug grooves 331 is in a range of from 16% or greater to 22% or less with respect to the maximum ground contact width Wb3 of the center land portion 33.

Additionally, as illustrated in FIGS. 3 and 7, the plurality of through lug grooves 331 includes a first through lug groove 331A having a groove bottom sipe 333 and a second through lug groove 331B not having a groove bottom sipe. For example, in the configuration of FIG. 7, the first through lug groove 331A and the second through lug groove 331B are disposed alternately in the tire circumferential direction. However, no such limitation is intended, and two or three second through lug grooves 331B may be disposed between adjacent first through lug grooves 331A, 331A (not illustrated). In addition, as illustrated in FIG. 3, the first through lug grooves 331A of the center land portion 33 having the groove bottom sipe 333 and the first through lug grooves 321A of the middle land portion 32 having the groove bottom sipe 323 are arranged in a staggered manner in the tire circumferential direction. In other words, the through lug grooves 321A, 321B, 331A, 331B of each of the land portions 32, 33 are arranged so that the first through lug grooves 331A of the center land portion 33 having the groove bottom sipe 333 and the first through lug grooves 321A of the middle land portion 32 having the groove bottom sipe 323 do not face each other across the center main groove 22.

Additionally, the distance H33' (not illustrated) from the groove bottom of the through lug groove 331 to the maximum depth position of the groove bottom sipe 333 is in a range of $0.06 \leq H33'/Hg2$, and preferably in a range of $0.10 \leq H33'/Hg2$ with respect to the maximum groove depth Hg2 (not illustrated) of the center main groove 22. Additionally, the distance H33 (not illustrated) from the tread contact surface to the maximum depth position of the groove bottom sipe 333 is in a range of $H33/Hg2 \leq 1.00$, and preferably in a range of $H33/Hg2$ to $\leq 0.50$ with respect to the maximum groove depth Hg2 of the center main groove 22.

The block 332 is defined by the plurality of through lug grooves 331. In addition, the block 332 has a shape that is long in the tire width direction. Specifically, in FIG. 7, the pitch length of the block 332 (equal to the pitch length P31 of the through lug grooves 331) is in a range of from 45% or greater to 80% or less, and preferably in a range of from 50% or greater to 75% or less with respect to the maximum ground contact width Wb3 of the center land portion 33.

Shoulder Land Portion

Figure 8:
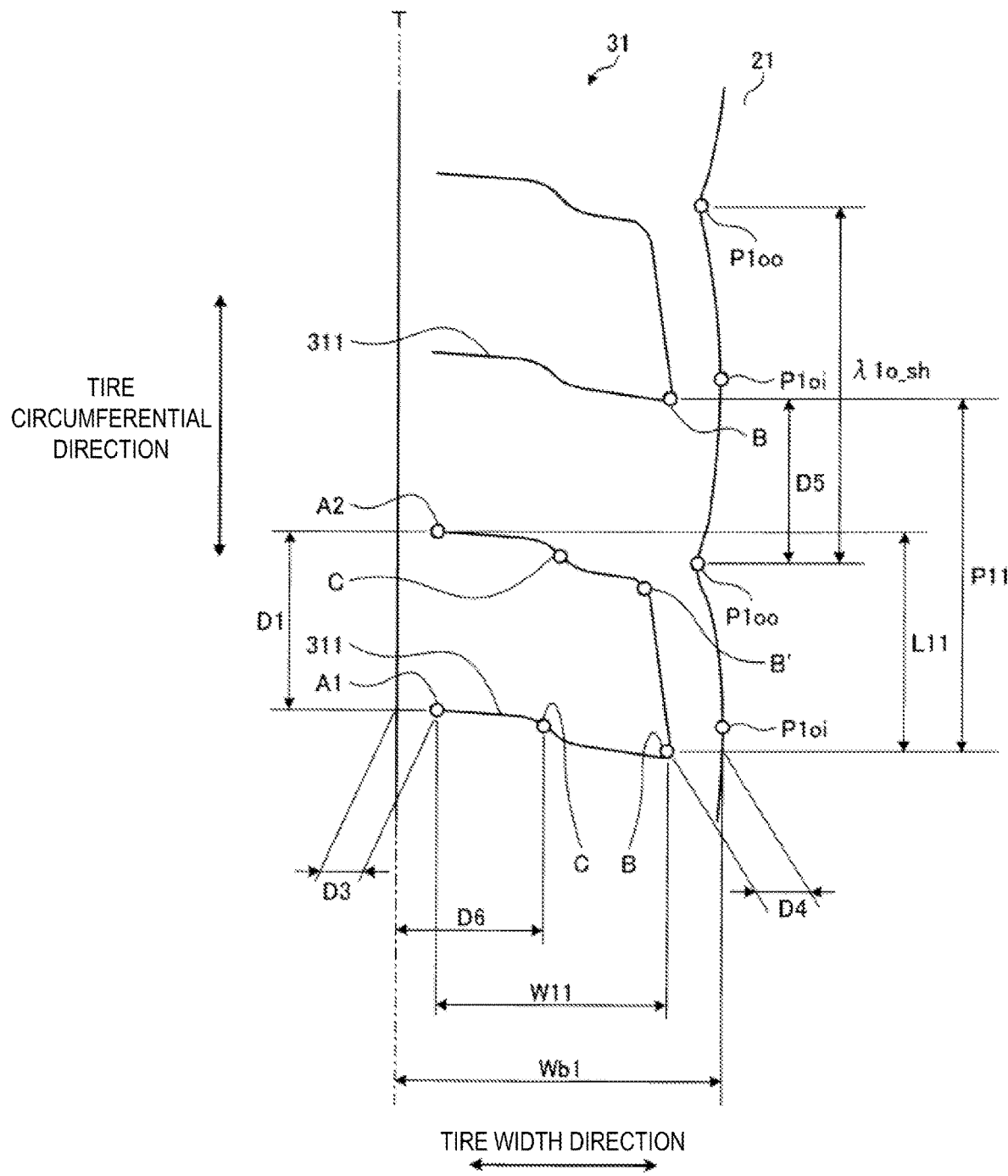
FIG. 8 is an enlarged view illustrating the shoulder land portion of the tire illustrated in FIG. 2.
Figure 9:
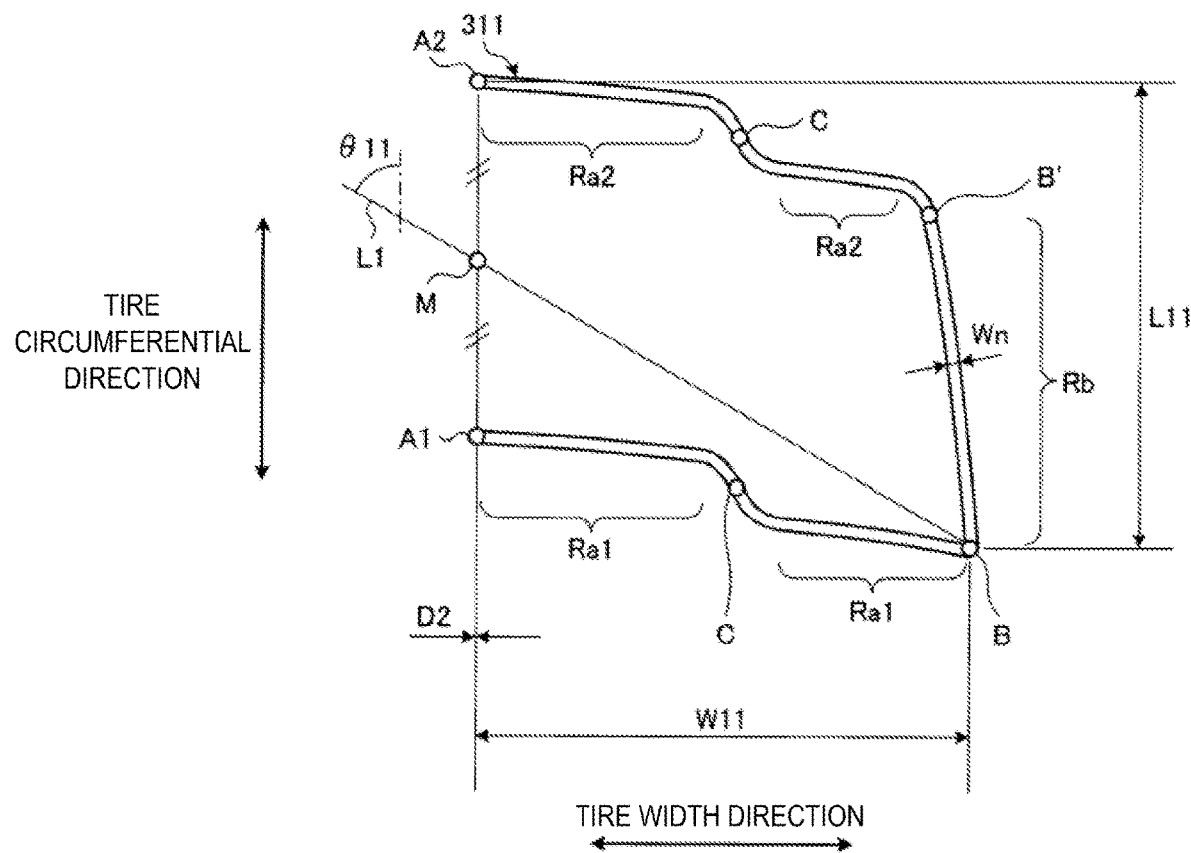
FIG. 9 is an enlarged view illustrating a narrow shallow groove of the shoulder land portion illustrated in FIG. 8.
Figure 10:
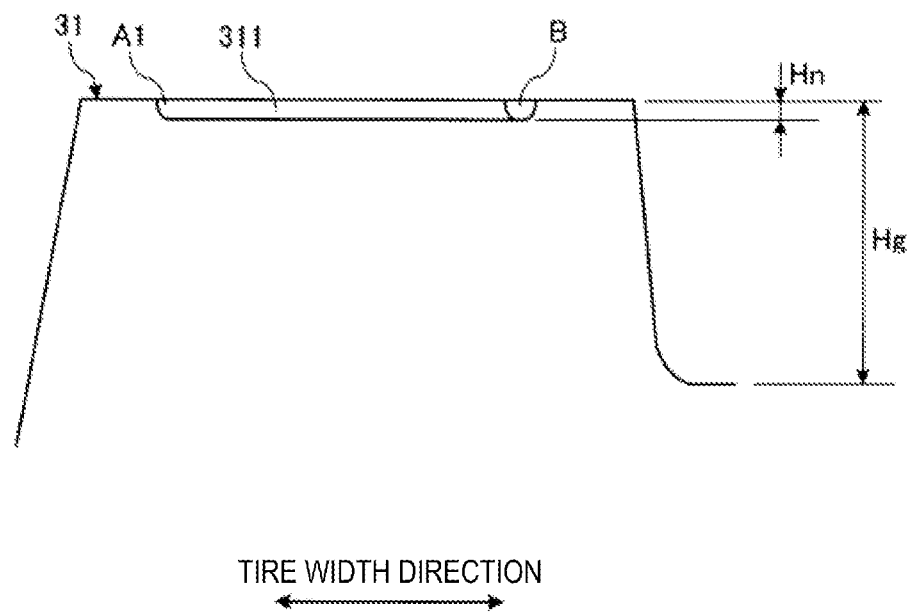
FIG. 10 is a cross-sectional view of the shoulder land portion illustrated in FIG. 8.

FIG. 8 is an enlarged view illustrating the shoulder land portion 31 of the tire 1 illustrated in FIG. 2. FIG. 9 is an enlarged view illustrating the narrow shallow groove 311 of the shoulder land portion 31 illustrated in FIG. 8. The same drawing illustrates a single narrow shallow groove 311. FIG. 10 is a cross-sectional view of the shoulder land portion 31 illustrated in FIG. 8. The same drawing illustrates a cross-sectional view of the shoulder land portion 31 taken along the narrow shallow groove 311.

In the configuration of FIG. 2, as described above, the shoulder land portion 31 is a rib having a road contact surface continuous in the tire circumferential direction, and is not divided in the tire circumferential direction by lug grooves or sipes. Additionally, the edge portion on the shoulder main groove 21 side of the shoulder land portion 31 has a wave-like shape formed by connecting a plurality of arcs that project toward the tire equatorial plane CL.

As illustrated in FIG. 2, the shoulder land portion 31 includes a plurality of narrow shallow grooves 311.

The narrow shallow grooves 311 have a U-shape (or a V-shape or a C-shape) having an opening portion facing the tire ground contact edge T. In other words, the narrow shallow grooves 311 have a continuous single-sided aperture shape having a closed portion on the tire equatorial plane CL side and an opening portion on the tire ground contact edge T side. Additionally, the narrow shallow grooves 311 have a closed structure that terminates in the ground contact surface of the shoulder land portion 31. Therefore, the narrow shallow grooves 311 are not connected to the tire ground contact edge T and the shoulder main grooves 21, and are disposed to be separated from the edge portion of the road contact surface of the shoulder land portion 31. Additionally, the plurality of narrow shallow grooves 311 are disposed at predetermined intervals in the tire circumferential direction. Additionally, adjacent narrow shallow grooves 311 are disposed so as to be separated from each other.

Additionally, the maximum groove width Wn of the narrow shallow grooves 311 (see FIG. 9) is in a range of $0.1 \text{ mm} \leq Wn \leq 5.0 \text{ mm}$, and preferably in a range of $0.3 \text{ mm} \leq Wn \leq 2.0 \text{ mm}$. Additionally, the maximum groove depth Hn of the narrow shallow grooves 311 (see FIG. 10) has a relationship of $0.01 \leq Hn/Hg \leq 0.30$, and preferably a relationship of $0.03 \leq Hn/Hg \leq 0.25$ with respect to the maximum groove depth Hg of the shoulder main grooves 21. Since the narrow shallow grooves 311 have the maximum groove width Wn and the maximum groove depth Hn described above, the narrow shallow grooves 311 function as grooves by opening without closing when the tire contacts the ground.

In the configuration described above, (1) since the narrow shallow grooves 311 have a U-shape, the acceleration performance on snow of the tire during traveling of a vehicle is improved by the circumferential components of the narrow shallow grooves 311, as compared to a configuration provided with a plurality of I-shaped width direction narrow grooves arranged in the tire circumferential direction (not illustrated). Additionally, (2) since the narrow shallow grooves 311 have a U-shape with the opening portion facing the tire ground contact edge T, the circumferential components of the narrow shallow grooves in the region on the tire ground contact edge T side can be omitted as compared to, for example, a configuration provided with narrow shallow grooves having an annular structure (not illustrated). As a result, the noise performance of the tire during traveling of a vehicle is improved, and uneven wear originating from the narrow shallow grooves 311 is suppressed. Additionally, (3) since the narrow shallow grooves 311 have a closed structure that terminates in the ground contact surface of the land portion 31, the noise performance of the tire is improved as compared to a configuration provided with narrow shallow grooves that pass through the ground contact surface of the land portion in the tire width direction or the tire circumferential direction (not illustrated).

Additionally, in FIG. 8, the width direction length W11 of the narrow shallow grooves 311 has a relationship of $0.40 \leq W11/Wb1 \leq 0.90$, and preferably a relationship of $0.50 \leq W11/Wb1 \leq 0.80$ with respect to the maximum ground contact width Wb1 of the shoulder land portion 31.

The width direction length W11 of the narrow shallow grooves 311 is measured as the maximum extension length in the tire width direction of the narrow shallow grooves 311 when the tire is mounted on a specified rim, inflated to the specified internal pressure, and in an unloaded state.

Additionally, in FIG. 8, the circumferential length L11 of the narrow shallow grooves 311 has a relationship of $0.50 \leq L11/P11 \leq 0.90$, and preferably a relationship of $0.60 \leq L11/P11 \leq 0.80$ with respect to the pitch length P11 of the narrow shallow grooves 311.

The circumferential length L11 of the narrow shallow grooves 311 is measured as the maximum extension length in the tire circumferential direction of the narrow shallow grooves 311 when the tire is mounted on a specified rim, inflated to the specified internal pressure, and in an unloaded state.

Additionally, the pitch number Pn of the narrow shallow grooves 311 is the same as the pitch number of the wave-like shapes of the edge portions of the shoulder land portion 31, and is in a range of from 50 or greater to 100 or less. In addition, the distance (not illustrated) of the adjacent narrow shallow grooves 311, 311 is preferably ensured in a range of 10 mm or greater.

Additionally, in FIG. 8, the distance D1 between the terminating points A1, A2 of the narrow shallow grooves 311 in the tire circumferential direction has a relationship of $0.30 \leq D1/P11 \leq 0.70$, and preferably a relationship of $0.40 \leq D1/P11 \leq 0.60$ with respect to the pitch length P11 of the narrow shallow grooves 311.

Additionally, in FIG. 8, the distance D2 (see FIG. 9) between the terminating points A1, A2 of the narrow shallow grooves 311 in the tire width direction has a relationship of $0 \leq D2/Wb1 \leq 0.70$, and preferably a relationship of $0 \leq D2/Wb1 \leq 0.50$ with respect to the maximum ground contact width Wb1 of the shoulder land portion 31.

Additionally, in FIG. 8, the distance D3 between the narrow shallow groove 311 and the tire ground contact edge T has a relationship of $0.05 \leq D3/Wb1$, and preferably a relationship of $0.10 \leq D3/Wb1$ with respect to the maximum ground contact width Wb1 of the shoulder land portion 31. Similarly, the distance D4 between the narrow shallow groove 311 and the edge portion of the shoulder land portion 31 has a relationship of $0.10 \leq D4/Wb1$, and preferably a relationship of $0.15 \leq D4/Wb1$ with respect to the maximum ground contact width Wb1 of the shoulder land portion 31. As a result, the rigidity of the edge portion of the shoulder land portion 31 is ensured. Note that the upper limit of the distances D3, D4 is not particularly limited, but is restricted by the relationship with the ratio W11/Wb1 of the width direction length W11 of the narrow shallow grooves 311 described above. Additionally, in the configuration of FIG. 8, the measurement point of the distance D3 is the terminating point A1, but the other terminating point A2 may be the measurement point of the distance D3 depending on the shape of the narrow shallow groove 311.

Additionally, in FIG. 8, the width direction length W11 and the circumferential length L11 of the narrow shallow grooves 311 have a relationship of $0.60 \leq W11/L11 \leq 1.40$, and preferably a relationship of $0.80 \leq W11/L11 \leq 1.20$.

Additionally, in FIG. 8, in a configuration in which the shoulder land portion 31 has an edge portion having a zigzag shape or a wave-like shape having an amplitude in the tire width direction, the distance D5 in the tire circumferential direction between the innermost point B in the tire width direction of the narrow shallow groove 311 and the maximum amplitude position P1oo on the outer side in the tire width direction of the edge portion of the shoulder land portion 31 is in a range of $0.30 \leq D5/\lambda1o\_sh \leq 0.70$ and preferably in a range of $0.45 \leq D5/\lambda1o\_sh \leq 0.65$ with respect to the wavelength $\lambda1o\_sh$ of the edge portion. Accordingly, the innermost point B of the narrow shallow groove 311 is disposed to be separated from the maximum amplitude position P1oo on the outer side in the tire width direction of the edge portion of the shoulder land portion 31. As a result, the rigidity of the edge portion of the shoulder land portion 31 is ensured.

As illustrated in FIG. 9, the pair of terminating points A1, A2 of the narrow shallow grooves 311 and the innermost point B in the tire width direction are defined. An imaginary line L1 that passes through the midpoint M and the innermost point B of the terminating points A1, A2 is defined. At this time, an angle $\theta11$ between the imaginary line L1 and the tire circumferential direction is in a range of $45° \leq \theta11 \leq 135°$, and preferably in a range of $50° \leq \theta11 \leq 70°$. As a result, the opening direction of the U-shape of the narrow shallow grooves 311 is made appropriate.

Additionally, in the configuration of FIG. 9, the U-shape of the narrow shallow grooves 311 has continuous width direction extending portions Ra1, Ra2 with an inclination angle of from 75° or greater to 105° or less with respect to the tire circumferential direction. The sum $\Sigma La$ of the width direction lengths La1 to La4 of the width direction extending portions Ra1, Ra2 (dimension symbol omitted in drawings) has a relationship of $1.00 \leq \Sigma La/W11$, and preferably a relationship of $1.30 \leq \Sigma La/W11$ with respect to the width direction length W11 of the narrow shallow groove 311. Additionally, each of the width direction lengths La1 to La4 of the width direction extending portions Ra1, Ra2 is preferably in a range of 25% or greater with respect to the width direction length W11 of the narrow shallow groove 311. As a result, the width direction lengths La1 to La4 of the width direction extending portions Ra1; Ra2 are ensured. Note that the upper limit of the ratio is not particularly limited but is restricted by other conditions.

The inclination angle of the U-shape of the narrow shallow groove 311 is measured as an angle between the tangent line of the groove center line of the narrow shallow groove and the tire circumferential direction.

Additionally, in the configuration of FIG. 9, the U-shape of the narrow shallow grooves 311 is provided with a continuous circumferential extending portion Rb having an inclination angle of from 0° or greater to 15° or less with respect to the tire circumferential direction. Additionally, the circumferential length Lb1 (dimension symbol omitted in drawings) of the circumferential extending portion Rb has a relationship 0.50≤Lb/L11, and preferably a relationship of 0.70≤Lb/L11 with respect to the circumferential length L11 of the narrow shallow groove 311. As a result, the circumferential length Lb1 of the circumferential extending portion Rb is ensured. Note that the upper limit of the ratio is not particularly limited but is restricted by other conditions.

In addition, as illustrated in FIG. 9, the U-shape of the narrow shallow grooves 311 is preferably provided with a bent portion (reference sign is omitted in the drawings) disposed in at least one of the regions between the points A1, B and between the points A2, B to connect adjacent width direction extending portions Ra1, Ra1; Ra2, Ra2. The bent portion has a crank shape or an S-shape. Further, the distance D6 from the tire ground contact edge T to the center point C of the bent portion preferably has a relationship of 0.30≤D6/Wb1≤0.70, and more preferably a relationship of 0.40≤D6/Wb1≤0.60 with respect to the maximum ground contact width Wb1 of the shoulder land portion 31. Thus, the bent portion of the narrow shallow groove 311 is disposed in the central portion in the width direction of the shoulder land portion 31.

For example, in the configuration of FIG. 9, the pair of terminating points A1, A2 of the narrow shallow grooves 311 are disposed at substantially the same position in the tire width direction. Additionally, the narrow shallow grooves 311 have a single innermost point B. The narrow shallow grooves 311 each include a pair of width direction extending portions Ra1, Ra1; Ra2, Ra2 that extend substantially in parallel to the tire width direction between the points A1, B and between the points A2, B', respectively. Additionally, two sets of the width direction extending portions Ra1, Ra1; Ra2, Ra2 are connected to each other via an S-shaped bent portion. As a result, a groove portion extending in a stepped shape in the tire width direction is formed. Additionally, the bent portions are inclined or bent in the same direction with respect to the tire circumferential direction. Additionally, the narrow shallow grooves 311 have a single circumferential extending portion Rb extending substantially in parallel to the tire circumferential direction from the innermost point B. Additionally, the circumferential extending portion Rb has a linear shape or a gentle arc shape that projects toward the tire equatorial plane CL, and is connected in a substantially L-shape to the width direction extending portions Ra1, Ra2 at the innermost point B and the other end point B'. Additionally, both end points B, B' of the pair of terminating points A1, A2 and the circumferential extending portion Rb are disposed to be offset from each other in the tire circumferential direction.

In the configuration of FIG. 9, the U-shape of the narrow shallow grooves 311 is made up of a single line that does not have a branch portion. However, no such limitation is intended, and the U-shape of the narrow shallow grooves 311 may have a branch portion that branches from midway (not illustrated).

Note that the edge portion on the shoulder main groove 21 side of the shoulder land portion 31 may have a plurality of fine multi-sipes (reference sign is omitted in drawings). These multi-sipes have a width of less than 1.0 mm and an extension length of less than 5.0 mm. Due to these multi-sipes, the uneven wear of the edge portion in the shoulder land portion 31 is suppressed.

Groove Wall Structure of Shoulder Main Groove

Figure 11:
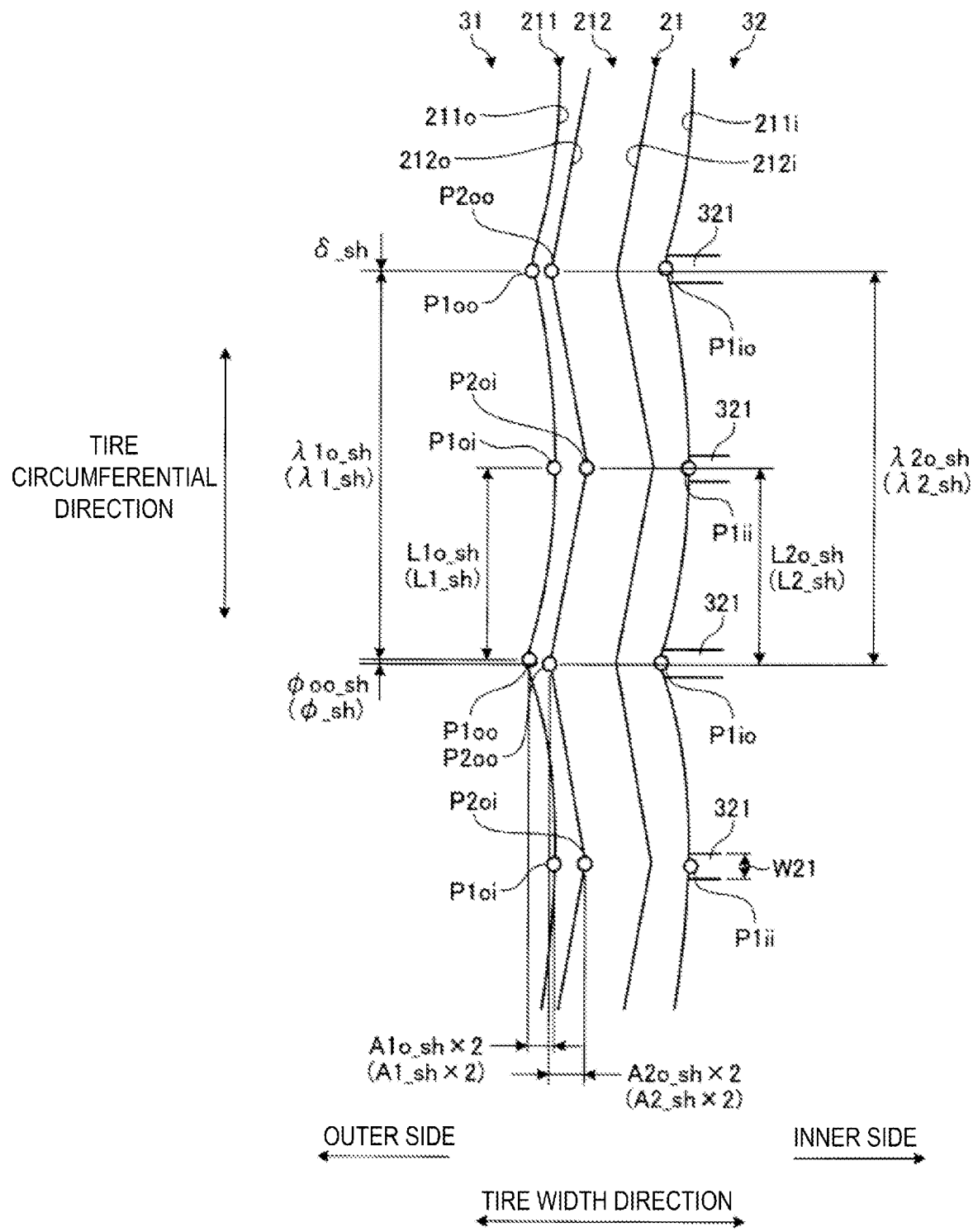
FIG. 11 is an enlarged plan view illustrating a groove wall structure of the shoulder main groove illustrated in FIG. 2.
Figure 12:
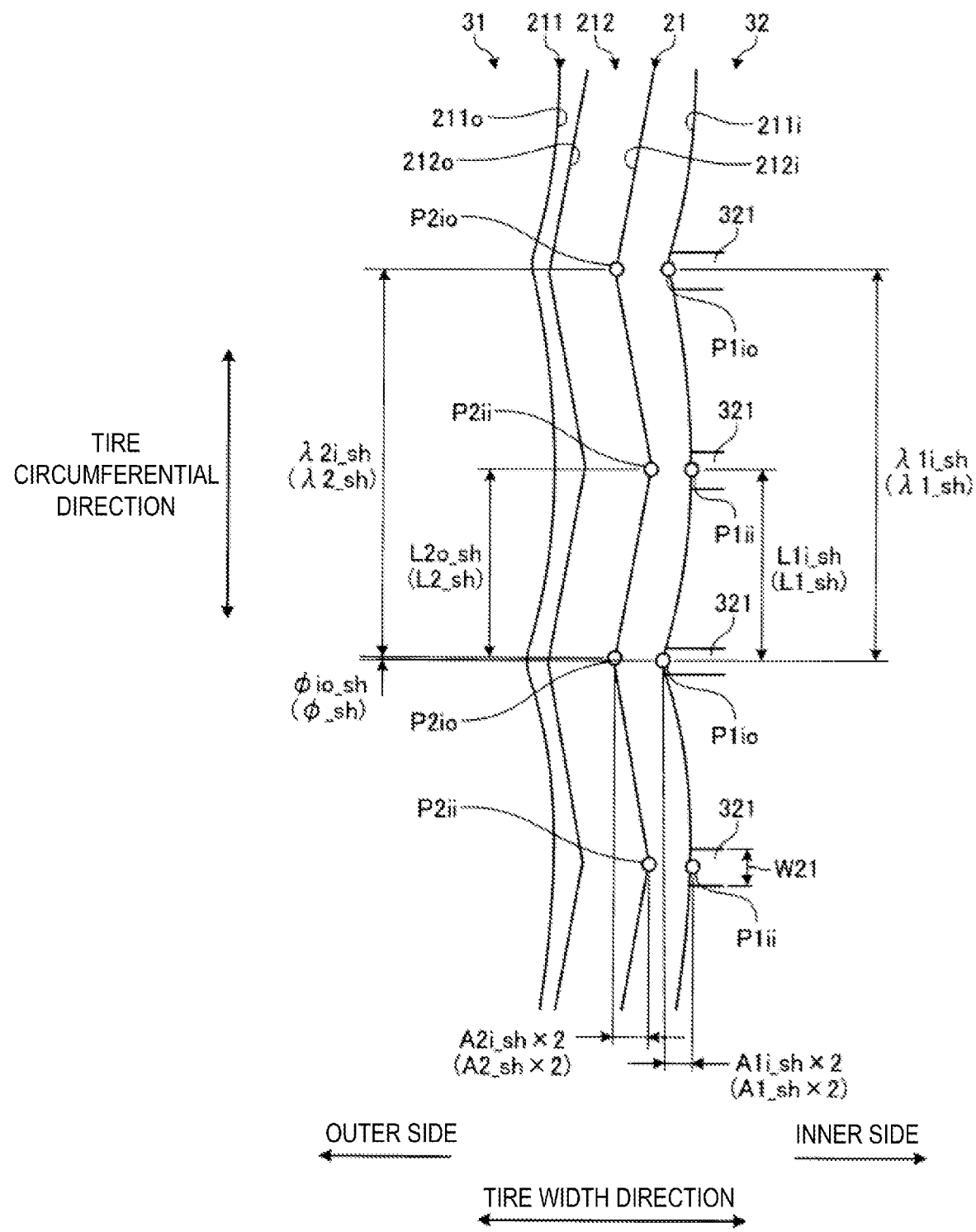
FIG. 12 is an enlarged plan view illustrating the groove wall structure of the shoulder main groove illustrated in FIG. 2.
Figure 13:
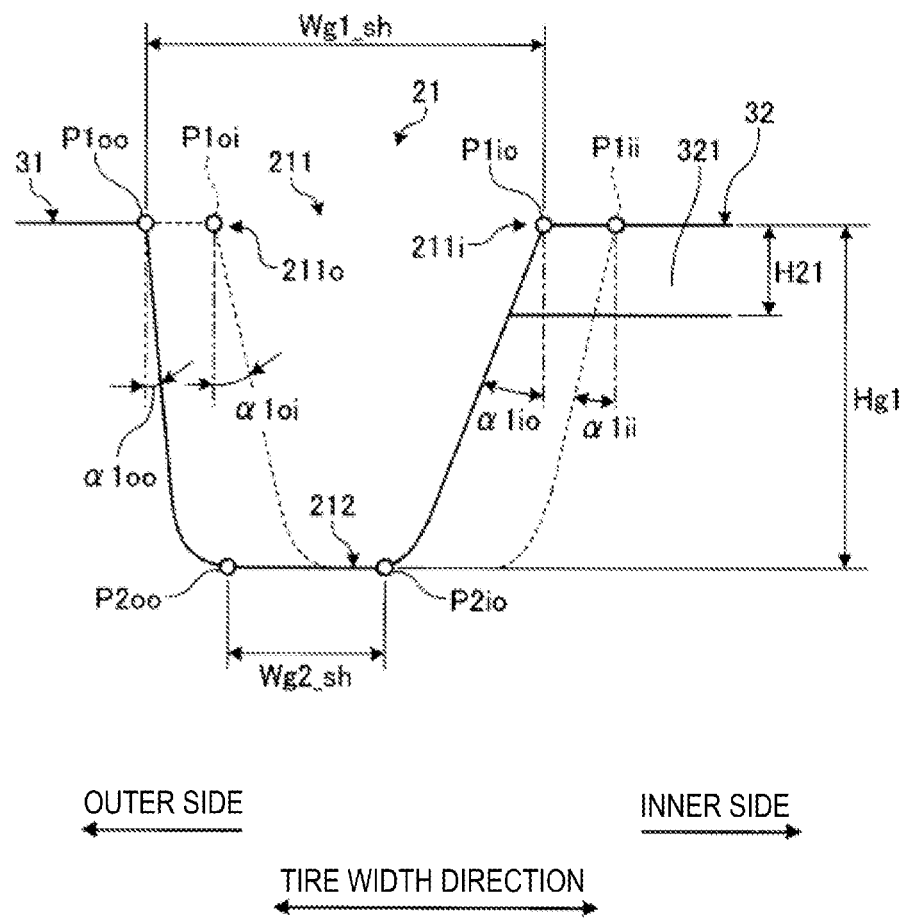
FIG. 13 is a cross-sectional view in a groove depth direction of the shoulder main groove illustrated in FIG. 2.

FIGS. 11 to 13 are enlarged plan views (FIGS. 11 and 12) and a cross-sectional view in the groove depth direction (FIG. 13) illustrating the groove wall structure of the shoulder main groove 21 illustrated in FIG. 2. In these drawings, FIG. 11 specifically illustrates the groove wall structure on the outer side in the tire width direction of the shoulder main groove 21, and FIG. 12 specifically illustrates the groove wall structure on the inner side in the tire width direction. FIG. 13 illustrates a cross-sectional view at the maximum amplitude position of the shoulder main groove 21 on the outer side in the tire width direction.

In the configuration of FIG. 2, as illustrated in FIG. 11, both the groove opening portion 211 and the groove bottom portion 212 of the shoulder main groove 21 have a zigzag shape or a wave-like shape having an amplitude in the tire width direction. However, no such limitation is intended, and the groove opening portion 211 of the shoulder main groove 21 may have a straight shape (not illustrated).

Here, in each of the groove opening portion and the groove bottom portion of the main groove, the outer edge portion and the inner edge portion in the tire width direction are defined. Additionally, in each of the outer edge portion and the inner edge portion, an outer maximum amplitude position that projects toward the outer side in the tire width direction and an inner maximum amplitude position that projects toward the inner side in the tire width direction are defined.

The edge portion of the groove opening portion is defined by an imaginary line connecting the intersection point (see, for example, FIG. 13) of the groove wall and the tread profile in a cross-sectional view in the groove depth direction across the entire region in the tire circumferential direction. In a configuration in which the edge portion includes a chamfered portion, the edge portion of the groove opening portion is connected to an intersection point (not illustrated) of the extension line of the groove wall and the tread profile to create an imaginary line.

The edge portion of the groove bottom portion is defined as an imaginary line connecting the end points of the maximum groove depth position in the cross-sectional view in the groove depth direction across the entire region in the tire circumferential direction. When the groove bottom portion of the main groove is a flat straight line at the maximum groove depth position (see, for example, FIG. 13), the outer edge portion and the inner edge portion of the groove bottom portion are defined at both end points of the flat straight line. On the other hand, when the groove bottom portion of the main groove has an arcuate shape or a funnel shape (not illustrated), the maximum groove depth position is one point, and the edge portion of the groove bottom portion is defined by one point. Therefore, the outer edge portion and the inner edge portion of the groove bottom portion described above are at the same position. The maximum groove depth position of the main groove is defined by excluding any raised bottom portions formed in the groove bottom portion of the main groove.

In the configuration of FIGS. 11 and 12, the groove opening portion 211 of the shoulder main groove 21 has a wave-like shape having an amplitude in the tire width direction at each of the outer edge portion 211o on the shoulder land portion 31 side and the inner edge portion 211i on the middle land portion 32 side. Furthermore, the groove bottom portion 212 of the shoulder main groove 21 has a zigzag shape having an amplitude in the tire width direction at each of the outer edge portion 212o on the shoulder land portion 31 side and the inner edge portion 212i on the middle land portion 32 side.

As illustrated in FIG. 11, the outer maximum amplitude position P1oo of the outer edge portion 211o of the groove opening portion 211 of the shoulder main groove 21 is at the same position in the tire circumferential direction with respect to the outer maximum amplitude position P2oo of the outer edge portion 212o of the groove bottom portion 212. Specifically, in FIG. 11, the offset amount $\phi$oo_sh of the outer maximum amplitude positions P1oo, P2oo of the groove opening portion 211 of the shoulder main groove 21 and the outer edge portions 211o, 212o of the groove bottom portion 212 has a relationship of $0 \leq \phi oo\_sh/\lambda 1o\_sh \leq 0.10$, and more preferably a relationship of $0 \leq \phi oo\_sh/\lambda 1o\_sh \leq 0.05$ with respect to the wavelength $\lambda 1o\_sh$ of the outer edge portion 211o of the groove opening portion 211.

The offset amount of the maximum amplitude positions is the distance in the tire circumferential direction of the maximum amplitude positions in a tread plan view when the tire is mounted on a specified rim, inflated to the specified internal pressure, and in an unloaded state.

Similarly, as illustrated in FIG. 12, the outer maximum amplitude position P1io of the inner edge portion 211i of the groove opening portion 211 of the shoulder main groove 21 is at the same position in the tire circumferential direction with respect to the outer maximum amplitude position P2io of the inner edge portion 212i of the groove bottom portion 212. Specifically, in FIG. 12, the offset amount $\phi$io_sh of the outer maximum amplitude positions P1io, P2io of the groove opening portion 211 of the shoulder main groove 21 and the inner edge portions 211i, 212i of the groove bottom portion 212 has a relationship of $0 \leq \phi io\_sh/\lambda 1i\_sh \leq 0.10$, and more preferably a relationship of $0 \leq \phi io\_sh/\lambda 1i\_sh \leq 0.05$ with respect to the wavelength $\lambda 1i\_sh$ of the inner edge portion 211i of the groove opening portion 211.

As illustrated in FIG. 11, the outer maximum amplitude position P1oo of the outer edge portion 211o and the outer maximum amplitude position P1io of the inner edge portion 211i of the groove opening portion 211 of the shoulder main groove 21 are at the same position in the tire circumferential direction. Specifically, the offset amount $\delta$_sh between the outer maximum amplitude position P1oo of the outer edge portion 211o and the outer maximum amplitude position P1io of the inner edge portion 211i in the groove opening portion 211 of the shoulder main groove 21 has a relationship of $0 \leq \delta\_sh/\lambda 1o\_sh \leq 0.10$, and more preferably a relationship of $0 \leq \delta sh/\lambda 1o\_sh \leq 0.05$ with respect to the wavelength $\lambda 1o\_sh$ of the outer edge portion 211o of the groove opening portion 211.

Additionally, in FIG. 11, the wavelength $\lambda 1o\_sh$ of the outer edge portion 211o of the groove opening portion 211 of the shoulder main groove 21 is set to be substantially the same as the wavelength $\lambda 2o\_sh$ of the outer edge portion 212o of the groove bottom portion 212. Specifically, the wavelengths $\lambda 1o\_sh$, $\lambda 2o\_sh$ of the groove opening portion 211 and the groove bottom portion 212 are in a range of $0.90 \leq 220\_sh/\lambda 1o\_sh \leq 1.10$.

Similarly, in FIG. 12, the wavelength $\lambda 1i\_sh$ of the inner edge portion 211i of the groove opening portion 211 of the shoulder main groove 21 is set to be substantially the same as the wavelength $\lambda 2i\_sh$ of the inner edge portion 212i of the groove bottom portion 212. Specifically, the wavelengths $\lambda 1i\_sh$, $\lambda 2i\_sh$ of the groove opening portion 211 and the groove bottom portion 212 are in a range of $0.90 \leq \lambda 2i\_sh/\lambda 1i\_sh \leq 1.10$.

Additionally, the wavelength $\lambda 2\_sh$ ($\lambda 2o\_sh$, $\lambda 2i\_sh$) of the groove bottom portion 212 of the shoulder main groove 21 has a relationship of $0.10 \leq \lambda 2\_sh/TW \leq 0.35$ with respect to the tire ground contact width TW.

Additionally, in FIG. 11, the maximum distance L1o_sh in the tire circumferential direction between the outer maximum amplitude position P1oo and the inner maximum amplitude position P1oi of the outer edge portion 211o of the groove opening portion 211 of the shoulder main groove 21 has a relationship of $0.50 \leq L1o\_sh/\lambda 1o\_sh \leq 0.60$, and preferably a relationship of $0.50 \leq L1o\_sh/\lambda 1o\_sh \leq 0.55$ with respect to the wavelength $\lambda 1o\_sh$ of the outer edge portion 211o. As a result, the rigidity of the tread contact surface when the tire is new is made uniform in the tire circumferential direction.

The maximum distance in the tire circumferential direction between the outer maximum amplitude position and the inner maximum amplitude position is measured as the larger one of the distances in the tire circumferential direction between the adjacent outer maximum amplitude positions and a certain inner maximum amplitude position between the outer maximum amplitude positions.

The wavelength $\lambda 1o\_sh$ of the outer edge portion 211o of the groove opening portion 211 of the shoulder main groove 21 is defined only when the shoulder main groove 21 has a zigzag shape or a wave-like shape and is not defined when the shoulder main groove 21 has a straight shape.

Similarly, in FIG. 12, the maximum distance L1i_sh in the tire circumferential direction between the outer maximum amplitude position P1io and the inner maximum amplitude position P1ii of the inner edge portion 211i of the groove opening portion 211 of the shoulder main groove 21 has a relationship of $0.50 \leq L1i\_sh/\lambda 1i\_sh \leq 0.60$, and preferably a relationship of $0.50 \leq L1i\_sh/\lambda 1i\_sh \leq 0.55$ with respect to the wavelength $\lambda 1i\_sh$ of the inner edge portion 211i.

Additionally, in FIG. 11, the maximum distance L2o_sh in the tire circumferential direction between the outer maximum amplitude position P2oo and the inner maximum amplitude position P2oi of the outer edge portion 212o of the groove bottom portion 212 of the shoulder main groove 21 has a relationship of $0.50 \leq L2o\_sh/\lambda 2o\_sh \leq 0.60$, and preferably a relationship of $0.50 \leq L2o\_sh/\lambda 2o\_sh \leq 0.55$ with respect to the wavelength $\lambda 2o\_sh$ of the outer edge portion 212o. Accordingly, the outer maximum amplitude position P2oo and the inner maximum amplitude position P2oi of the groove bottom portion 212 of the shoulder main groove 21 are disposed at substantially equal intervals in the tire circumferential direction.

Similarly, in FIG. 12, the maximum distance L2i_sh in the tire circumferential direction between the outer maximum amplitude position P2io and the inner maximum amplitude position P2ii of the inner edge portion 212i of the groove bottom portion 212 of the shoulder main groove 21 has a relationship of $0.50 \leq L2i\_sh/\lambda 2i\_sh \leq 0.60$, and preferably a relationship of $0.50 \leq L2i\_sh/\lambda 2i\_sh \leq 0.55$ with respect to the wavelength $\lambda 2i\_sh$ of the inner edge portion 212i.

Additionally, in FIG. 11, the amplitude A1o_sh of the outer edge portion 211o of the groove opening portion 211 of the shoulder main groove 21 has a relationship of $1.20 \leq A2o\_sh/\lambda 1o\_sh \leq 2.00$, more preferably a relationship of $1.30 \leq A2o\_sh/\lambda 1o\_sh \leq 1.80$ with respect to the amplitude A2o_sh of the outer edge portion 212o of the groove bottom portion 212. Accordingly, the amplitude A2o_sh of the zigzag shape of the groove bottom portion 212 is set to be larger than the amplitude A1o_sh of the wave-like shape of the groove opening portion 211.

Similarly, in FIG. 12, the amplitude A1i_sh of the inner edge portion 211*i* of the groove opening portion 211 of the shoulder main groove 21 has a relationship of $1.20 \le A2i\_sh/A1i\_sh \le 2.00$, and more preferably a relationship of $1.30 \le A2i\_sh/A1i\_sh \le 1.80$ with respect to the amplitude A2i_sh of the inner edge portion 212*i* of the groove bottom portion 212.

In the configuration described above, (1) since the amplitudes A1o_sh, A1i_sh of the groove opening portion 211 of the shoulder main groove 21 are set to be small, the rail uneven wear of the edge portion of the land portions 31, 32, which is likely to occur at the maximum amplitude position P1io, P1oi on the shoulder main groove 21 side, is suppressed. Additionally, (2) since the amplitudes A2o_sh, A2i_sh of the groove bottom portion 212 of the shoulder main groove 21 are set to be large, the rigidity of the land portions 31, 32 is ensured, and the tear resistance of the tire is ensured. As a result, the uneven wear resistance performance and the tear resistance performance of the tire are achieved in a compatible manner. Furthermore, (3) since the groove opening portion 211 of the shoulder main groove 21 has a zigzag shape or a wave-like shape having an amplitude in the tire width direction, the edge component of the land portions 31, 32 is increased, and the acceleration performance on snow of the tire is improved.

Additionally, in FIG. 12, the amplitude A1o_sh of the outer edge portion 211*o* of the groove opening portion 211 of the shoulder main groove 21 is set to be substantially the same with respect to the amplitude A1i_sh of the inner edge portion 211*i*. Specifically, the amplitude A1o_sh of the outer edge portion 211*o* has a relationship of $0.90 \le A1o\_sh/A1i\_sh \le 1.10$, and more preferably a relationship of $0.95 \le A1o\_sh/A1i\_sh \le 1.05$ with respect to the amplitude A1i_sh of the inner edge portion 211*i*.

Additionally, the amplitudes A1o_sh, A1i_sh of the groove opening portion 211 of the shoulder main groove 21 are in a range of from 0 mm or greater to 15.0 mm or less, and preferably in a range of from 2.0 mm or greater to 10.0 mm or less. When the amplitudes A1o_sh, A1i_sh are 0 mm, the groove opening portion 211 of the shoulder main groove 21 has a straight shape.

Additionally, the amplitudes A2o_sh, A2i_sh of the groove bottom portion 212 of the shoulder main groove 21 is in a range of from 2.5 mm or greater to 15.0 mm or less, and preferably in a range of from 4.0 mm or greater to 12.0 mm or less.

As illustrated in FIG. 13, the groove wall angle $\alpha$1oo at the outer maximum amplitude position P1oo of the outer edge portion 211*o* of the groove opening portion 211 of the shoulder main groove 21 has a relationship of $\alpha 1oo < \alpha 1oi$ with respect to the groove wall angle $\alpha$1oi at the inner maximum amplitude position P1oi of the outer edge portion 211*o*. Similarly, the groove wall angle $\alpha$1io at the outer maximum amplitude position P1io of the inner edge portion 211*i* of the groove opening portion 211 of the shoulder main groove 21 has a relationship of $\alpha 1ii < \alpha 1io$ with respect to the groove wall angle $\alpha$1ii at the inner maximum amplitude position P1ii of the inner edge portion 211*i*. Therefore, the groove wall angles $\alpha$1oi, $\alpha$1io of the shoulder main grooves 21 are set to be large at the position where the edge portion of the groove opening portion of the shoulder main groove 21 projects toward the shoulder main groove 21 (the inner maximum amplitude position P1oi of the outer edge portion 211*o* and the outer maximum amplitude position P1io of the inner edge portion 211*i* in FIG. 11). As a result, the rigidity of the land portions 31, 32 at the maximum amplitude positions P1oi, P1io is ensured.

Furthermore, as illustrated in FIG. 11, the entire groove bottom portion 212 of the shoulder main groove 21 is disposed so as to be biased toward the inner side in the tire width direction with respect to the entire groove opening portion 211. Therefore, the average value of the groove wall angle of the inner edge portion 211*i* of the shoulder main groove 21 is set to be greater than the average value of the groove wall angle of the outer edge portion 211*o*. Thus, the rigidity of the narrow middle land portion 32 (see FIG. 2) is ensured.

Additionally, in FIG. 13, the maximum width Wg2_sh of the groove bottom portion 212 of the shoulder main groove 21 has a relationship of $0 \le Wg2\_sh/Wg1\_sh \le 0.60$, and more preferably a relationship of $0.35 \le Wg2\_sh/Wg1\_sh \le 0.45$ with respect to the maximum width Wg1_sh of the groove opening portion 211 (that is, the maximum groove width of the shoulder main groove 21). When the groove bottom portion of the main groove has an arcuate shape or a funnel shape (not illustrated), the maximum width Wg2_sh of the groove bottom portion 212 is approximately 0.

Additionally, in the configuration of FIG. 11, both the outer edge portion 211*o* and the inner edge portion 211*i* of the groove opening portion 211 of the shoulder main groove 21 have a wave-like shape formed by connecting a plurality of arcs that project toward the inner side in the tire width direction (that is, toward the tire equatorial plane CL, see FIG. 2). Additionally, the circumferential length of the arc (dimension symbol omitted in drawings) is 80% or greater, and more preferably, 85% or greater, with respect to the wavelength $\lambda$1o_sh of the outer edge portion 211*o*. Additionally, adjacent arcs are connected via short straight lines or arcs. In such a configuration, it is desirable in that, as compared to a configuration in which the edge portion has a zigzag shape or a sinusoidal shape, uneven wear at the maximum projection position of the edge portion is suppressed.

However, no such limitation is intended, and the groove opening portion 211 of the shoulder main groove 21 may have a linear shape or a zigzag shape as described above, or may have a sinusoidal wave-like shape (not illustrated).

Additionally, in the configuration of FIG. 11, both the outer edge portion 212*o* and the inner edge portion 212*i* of the groove bottom portion 212 of the shoulder main groove 21 have a zigzag shape formed by connecting linear portions having substantially the same length in the tire circumferential direction. Additionally, the circumferential length of the groove bottom portion 212 (in FIG. 11, the circumferential length is substantially equal to the maximum distance L2o_sh in the tire circumferential direction between the maximum amplitude positions P2oo, P2oi of the outer edge portion 212*o*) is preferably in a range of from 40% or greater to 60% or less with respect to the wavelength $\lambda$2o_sh of the outer edge portion 212*o*.

However, no such limitation is intended, and the groove bottom portion 212 of the shoulder main groove 21 may have a wave-like shape as described above (not illustrated).

Modified Example of Narrow Shallow Grooves

FIGS. 14 to 23 are explanatory diagrams illustrating modified examples of the narrow shallow groove 311 illustrated in FIG. 9. In the same drawing, constituents that are the same as the constituents illustrated in FIG. 9 are denoted by the same reference signs, and explanations thereof are omitted.

In the configuration of FIG. 9, the circumferential extending portion Rb has a linear shape or a gentle arc shape that is inclined with respect to the tire circumferential direction, whereby the narrow shallow grooves 311 have a single innermost point B'. Furthermore, the innermost point B' is located at the connection portion between the width direction extending portion Ra1 and the circumferential extending portion Rb of the narrow shallow groove 311.

Figure 14:
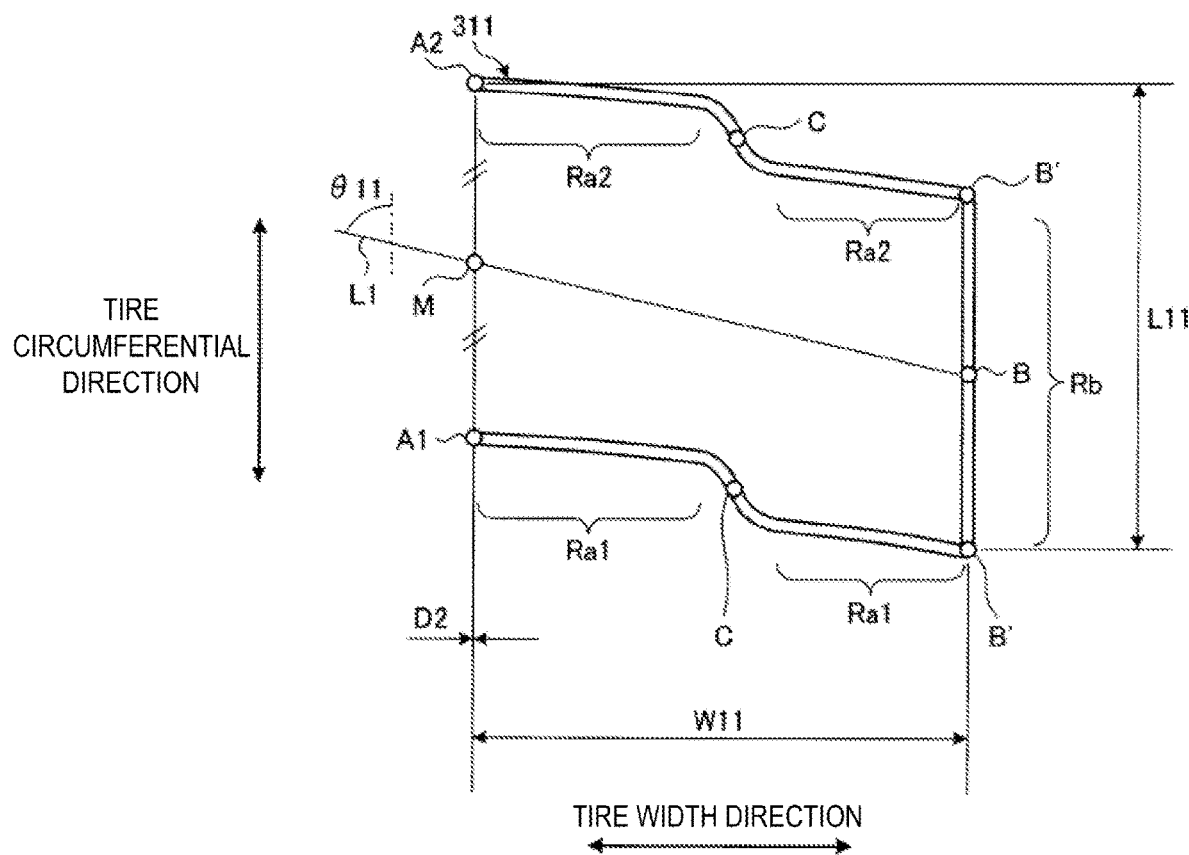
FIG. 14 is an explanatory diagram of a modified example of the narrow shallow groove illustrated in FIG. 9.
Figure 15:
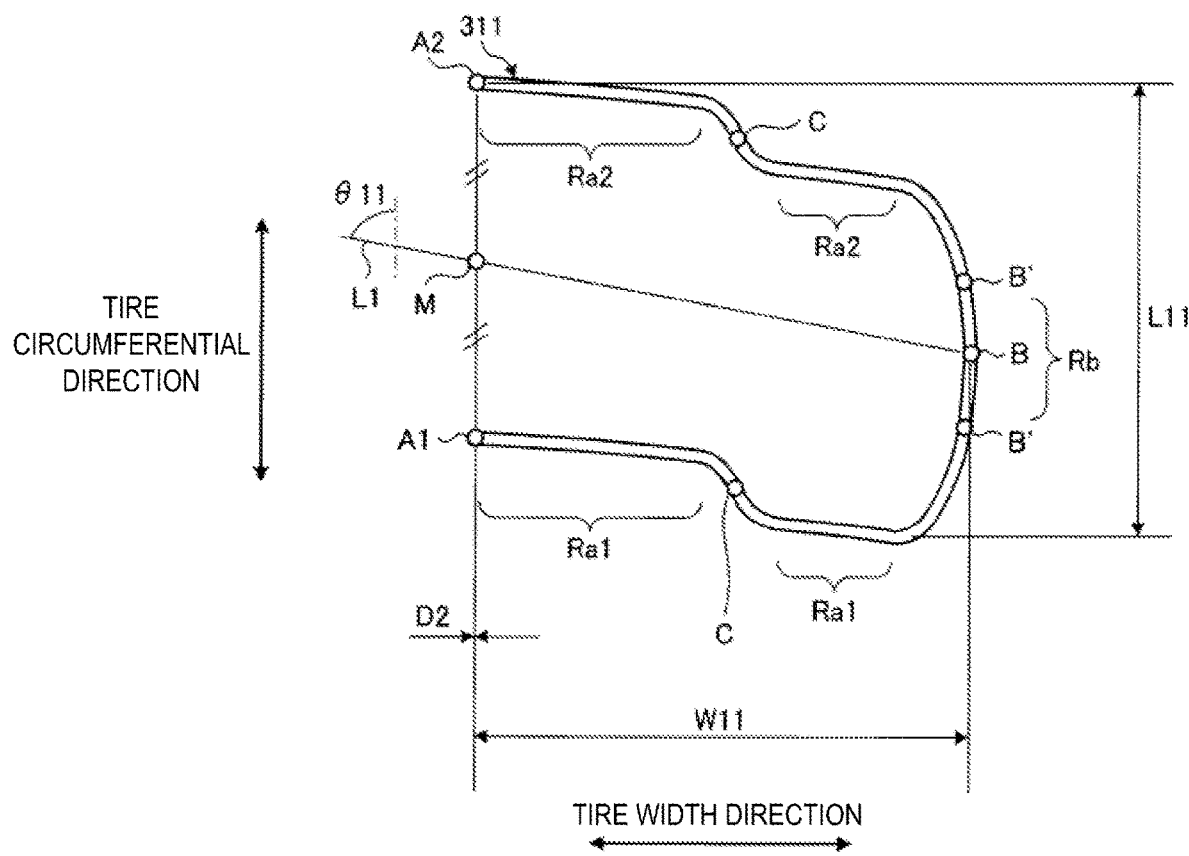
FIG. 15 is an explanatory diagram of a modified example of the narrow shallow groove illustrated in FIG. 9.

In contrast, in the configuration of FIG. 14, the circumferential extending portion Rb is formed by a straight line parallel with the tire circumferential direction. In this case, the center point of a region of the groove portion of the narrow shallow groove 311 on the innermost side in the tire width direction (in FIG. 14, the entire circumferential extending portion Rb) is defined as the innermost point B' of the narrow shallow groove 311. Additionally, in the configuration of FIG. 15, the left and right width direction extending portions Ra1; Ra2 are connected via an arc-shaped groove portion that projects toward the tire equatorial plane CL. Additionally, the protrusion portion having an arc shape includes the innermost point B' and the circumferential extending portion Rb of the narrow shallow grooves 311.

Additionally, in the configuration of FIG. 9, the narrow shallow grooves 311 have a pair of width direction extending portions Ra1, Ra1; Ra2, Ra2 that extend substantially in parallel to the tire width direction between the points A1, B and between the points A2, B, respectively.

Figure 16:
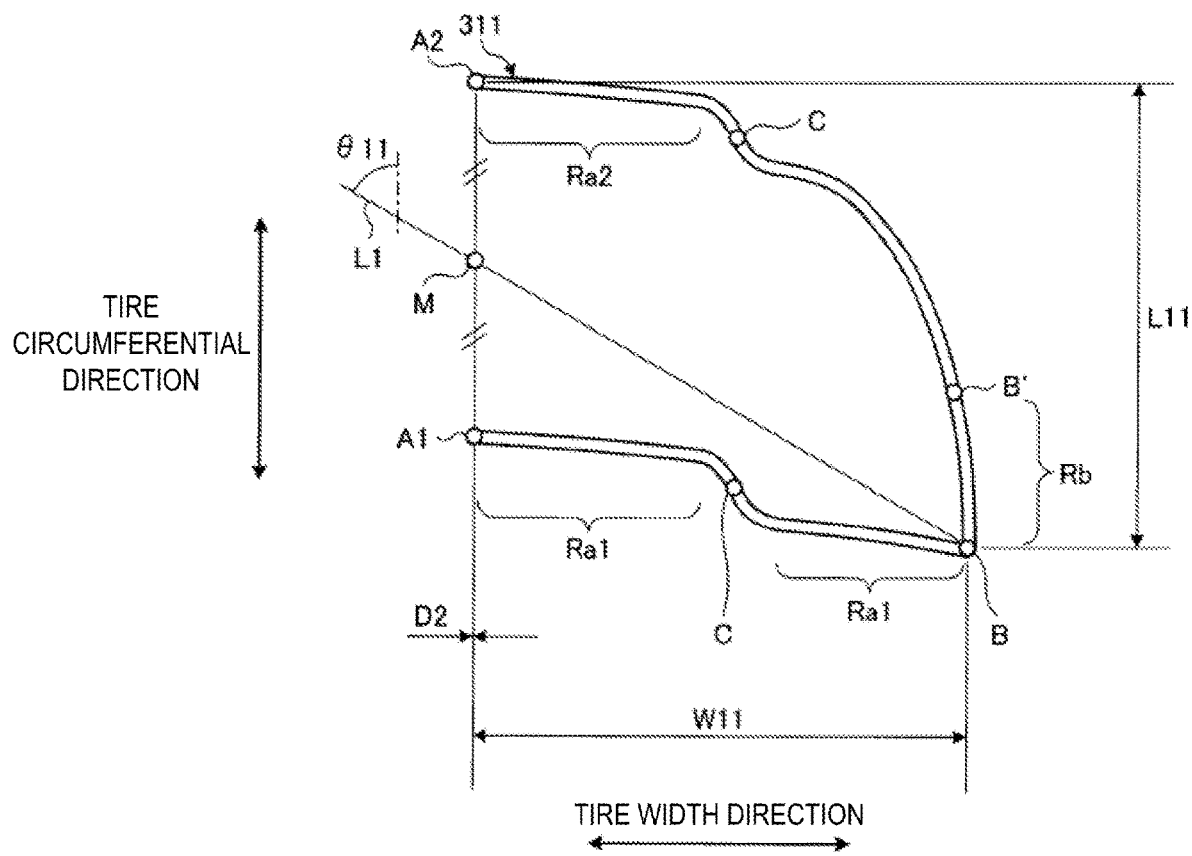
FIG. 16 is an explanatory diagram of a modified example of the narrow shallow groove illustrated in FIG. 9.

In contrast, in the configuration of FIG. 16, the narrow shallow grooves 311 have a pair of width direction extending portions Ra1, Ra1 between the points A1, B and a single width direction extending portion Ra2 between the points A2, B. Additionally, the width direction extending portion Ra2 and the innermost point B on the point A2 side are connected via an elongated arc including a short and S-shaped bent portion and the circumferential extending portion Rb.

In the configuration of FIG. 9, the pair of terminating points A1, A2 of the narrow shallow grooves 311 are disposed at substantially the same position in the tire width direction. Therefore, the distance D2 between the terminating points A1, A2 in the tire width direction is approximately zero.

Figure 17:
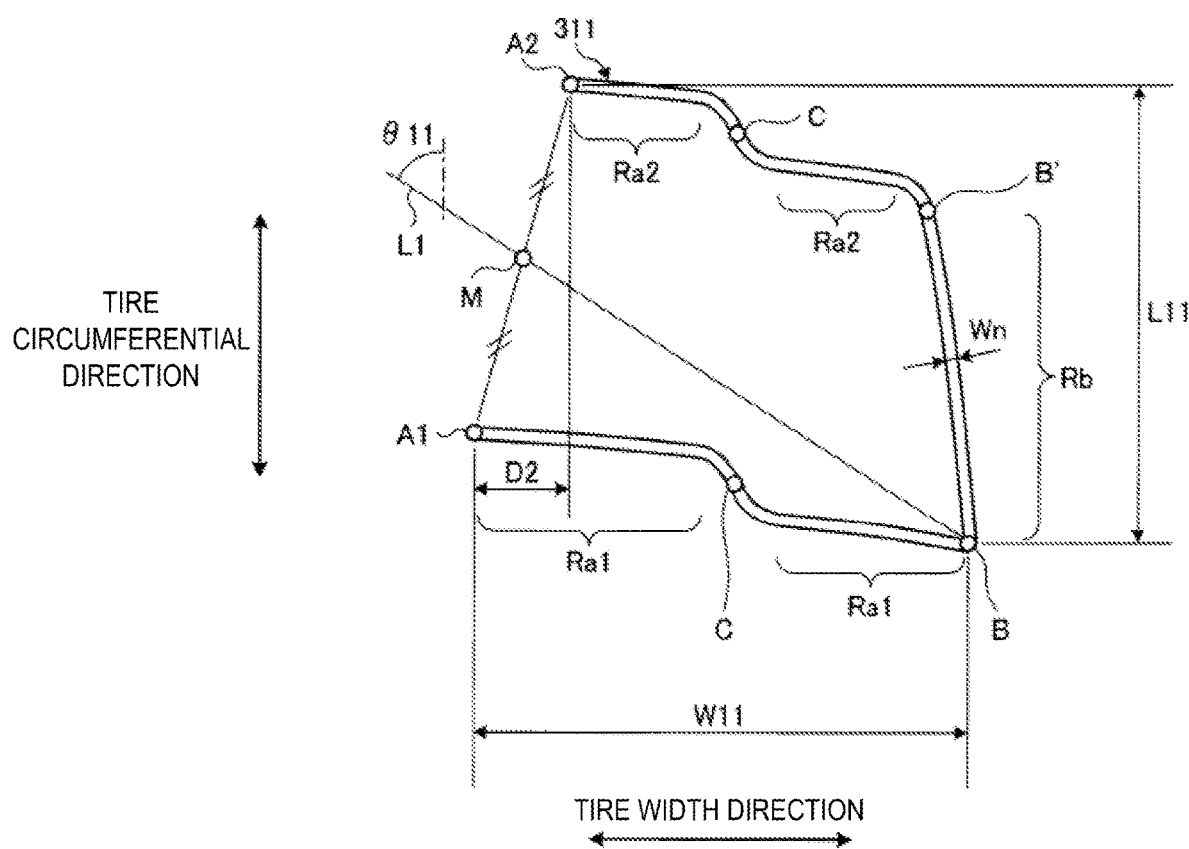
FIG. 17 is an explanatory diagram of a modified example of the narrow shallow groove illustrated in FIG. 9.

In contrast, in the configuration of FIG. 17, the pair of terminating points A1, A2 of the narrow shallow grooves 311 are disposed to be offset from each other in the tire width direction. In such a configuration, since the angle θ11 of the narrow shallow grooves 311 is in the range described above, it can be said that the narrow shallow grooves 311 have opening portions facing the tire ground contact edge T.

Additionally, in the configuration of FIG. 9, the opening portion of the U-shape of the narrow shallow grooves 311 is configured by the width direction extending portions Ra1, Ra2 having a linear shape or a gentle arc shape, and these width direction extending portions Ra1, Ra2 have the terminating points A1, A2 of the narrow shallow grooves 311.

Figure 18:
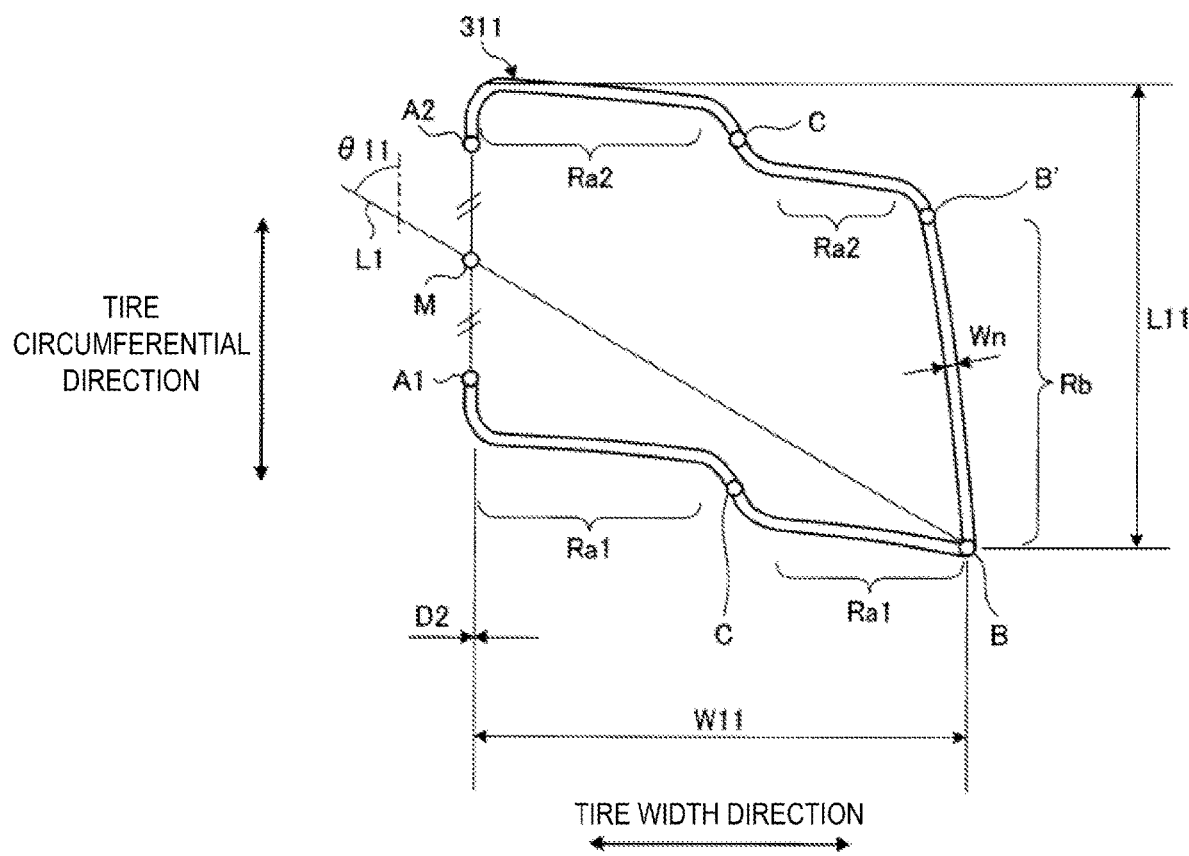
FIG. 18 is an explanatory diagram of a modified example of the narrow shallow groove illustrated in FIG. 9.
Figure 19:
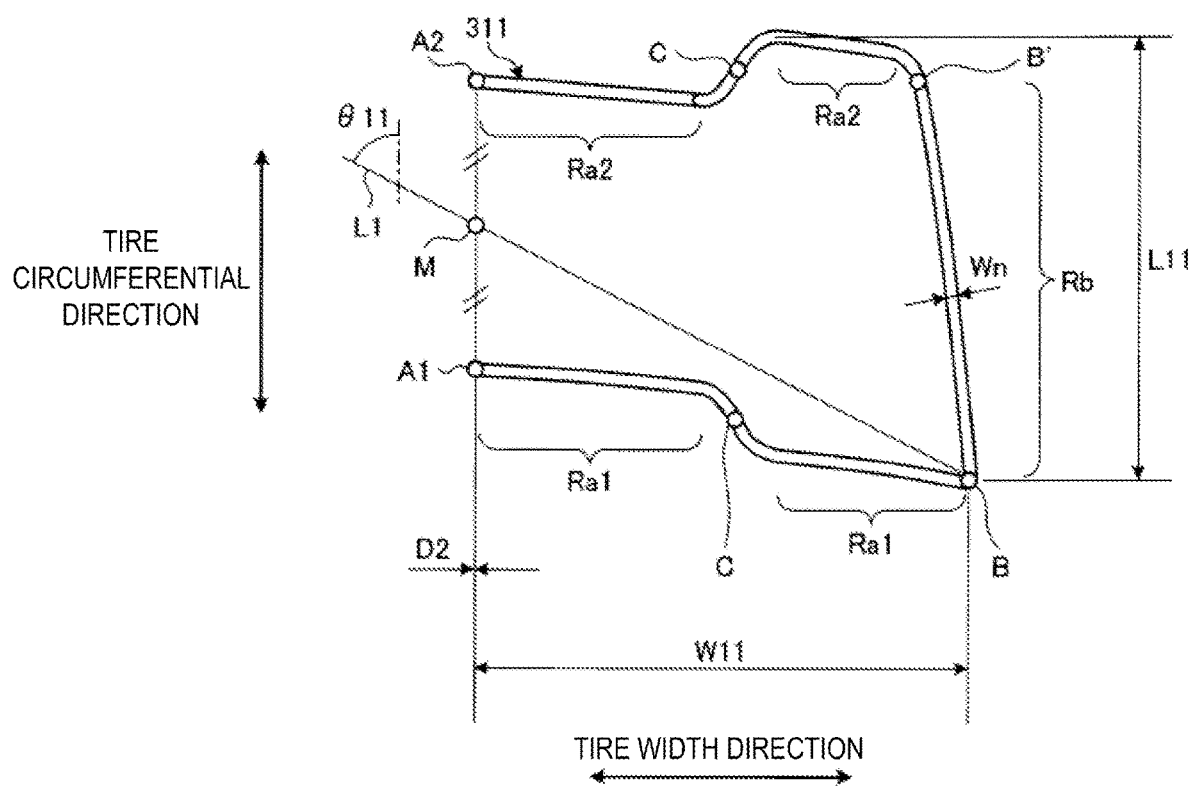
FIG. 19 is an explanatory diagram of a modified example of the narrow shallow groove illustrated in FIG. 9.

In contrast, in the configuration of FIG. 18, the opening portion of the U-shape of the narrow shallow grooves 311 is curved in a direction that narrows the opening width toward the terminating points A1, A2. Additionally, in the configuration of FIG. 19, the S-shaped bent portions connecting the adjacent width direction extending portions Ra1, Ra1; Ra2, Ra2 are curved in a direction that narrows the opening width of the U-shape. As described above, the U-shape of the narrow shallow grooves 311 may have a shape with a narrow opening width.

Additionally, in the configuration of FIG. 9, the narrow shallow grooves 311 each have the pair of width direction extending portions Ra1, Ra1; Ra2, Ra2 that extend substantially in parallel to the tire width direction between the points A, B and between the points A2, B, respectively, and each of the two sets of the width direction extending portions Ra1, Ra1; Ra2, Ra2 are connected to each other via an S-shaped bent portion.

Figure 20:
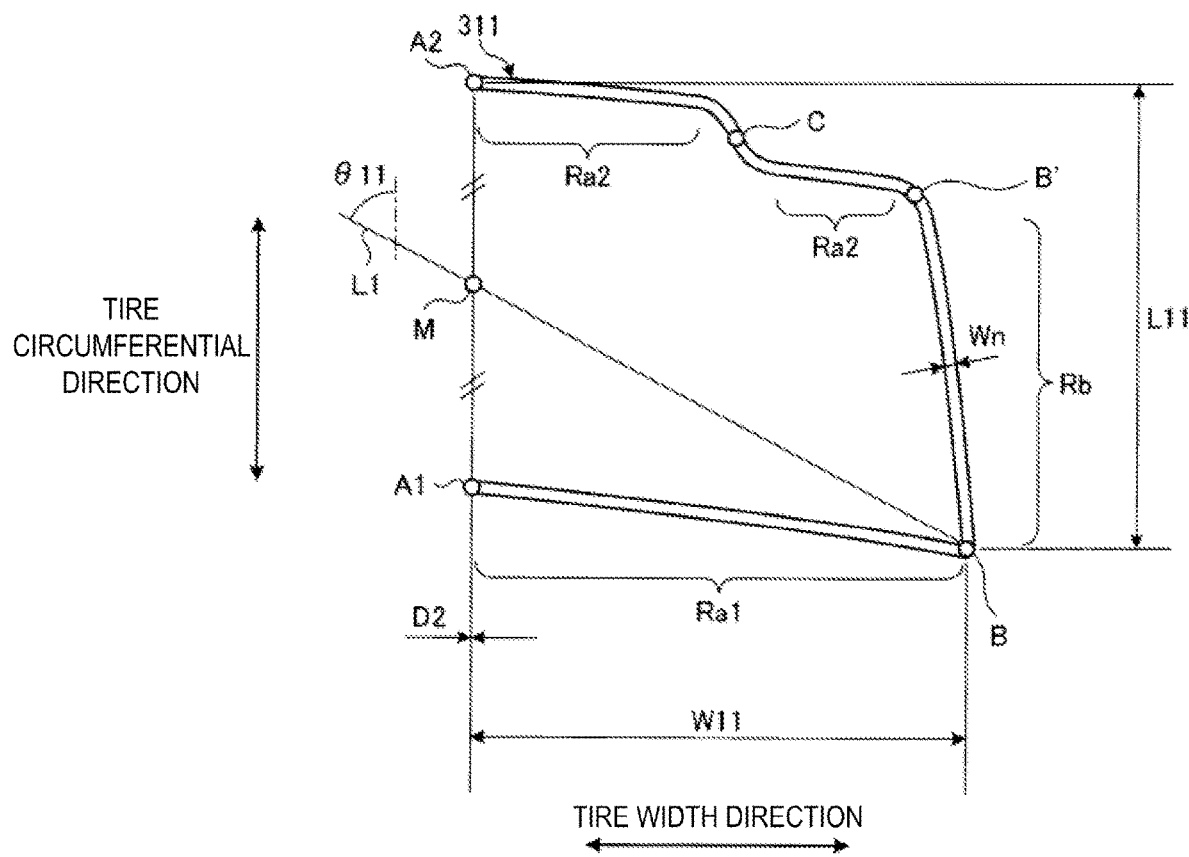
FIG. 20 is an explanatory diagram of a modified example of the narrow shallow groove illustrated in FIG. 9.
Figure 21:
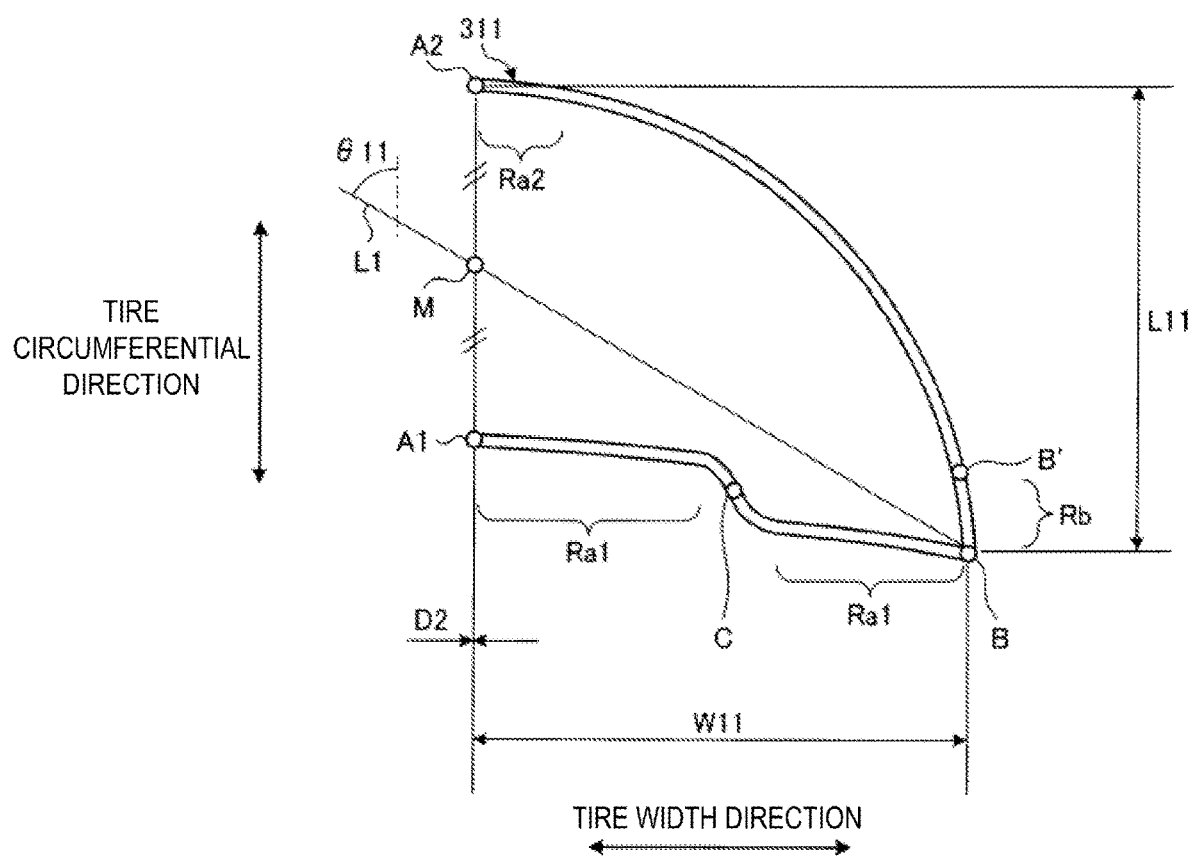
FIG. 21 is an explanatory diagram of a modified example of the narrow shallow groove illustrated in FIG. 9.

In contrast, in the configuration of FIG. 20, the narrow shallow grooves 311 have a single width direction extending portion Ra1 between the points A1, B and have a pair of width direction extending portions Ra2, Ra2 between the points A2, B. Furthermore, the points A1, B are connected by the long and linear width direction extending portion Ra1. Additionally, in the configuration of FIG. 21, a pair of width direction extending portions Ra1, Ra1 is provided between the points A1, B, and a width direction extending portion is not provided between the points A2, B. Additionally, the points A2, B are connected by a long and arc-shaped groove portion.

Figure 22:
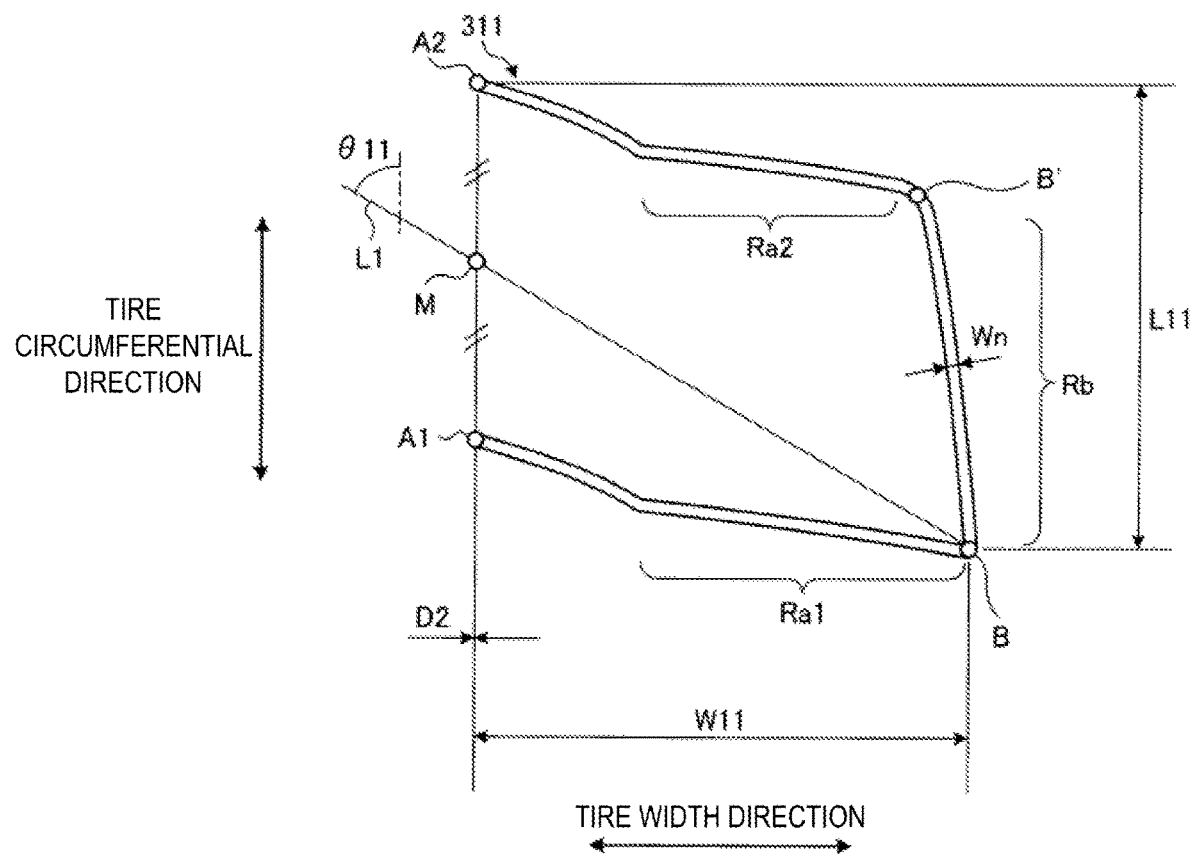
FIG. 22 is an explanatory diagram of a modified example of the narrow shallow groove illustrated in FIG. 9.
Figure 23:
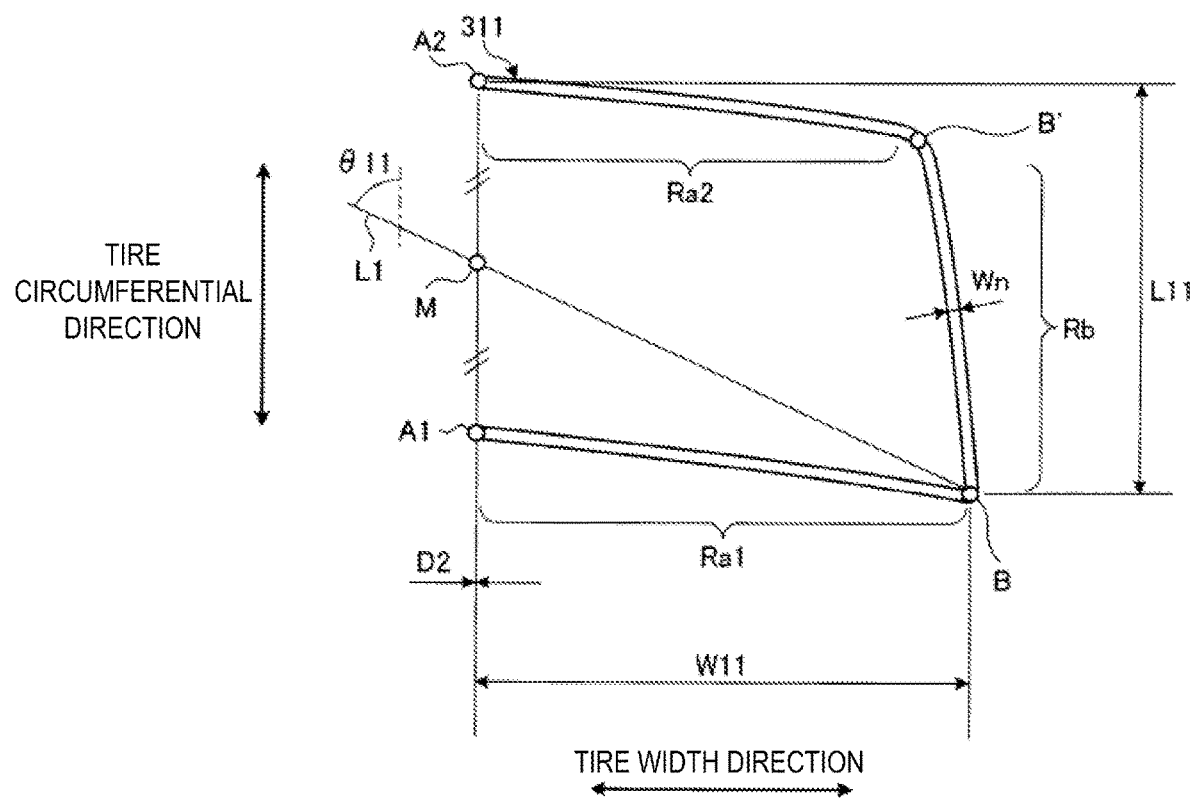
FIG. 23 is an explanatory diagram of a modified example of the narrow shallow groove illustrated in FIG. 9.

Additionally, in the configuration of FIGS. 22 and 23, the narrow shallow grooves 311 have a single long width direction extending portion Ra1; Ra2 between the points A1, B and between the points A2, B, respectively. In particular, in the configuration of FIG. 23, the points A1, B, and the points A2, B are connected by the width direction extending portion Ra1; Ra2.

Effect 1

As described above, the tire 1 includes a plurality of main grooves 21, 22 extending in the tire circumferential direction and four or more rows of land portions 31 to 33 defined by the main grooves 21, 22 (see FIG. 2). Additionally, at least one row of land portions (in FIG. 2, the middle land portion 32 and the center land portion 33) includes a plurality of through lug grooves 321; 331 that pass through the land portion 32; 33 in the tire width direction (see FIG. 3). The pitch length P21; P31 of the through lug grooves 321; 331 is in a range of from 7% or greater to 14% or less of the tire maximum ground contact length Lt (not illustrated). Additionally, the maximum groove depth H21 (see FIG. 5); H31 (not illustrated) of the through lug grooves 321; 331 is in a range of from 5% or greater to 65% or less of the maximum groove depth Hg1; Hg2 of the main groove 21; 22.

In such a configuration, there is an advantage that the relationship between the pitch length λ2; λ3 and the maximum groove depth H21; H31 of the through lug grooves 321; 331 is made appropriate, and the acceleration performance on snow and low rolling resistance performance of the tire are achieved in a compatible manner. Specifically, the range of the pitch length P21; P31 of the through lug grooves 321; 331 has the lower limit, and the range of the maximum groove depth H21; H31 of the through lug grooves 321; 331 has the upper limit. As a result, the rigidity of the land portion 32; 33 is ensured and degradation of the rolling resistance of the tire is suppressed. Additionally, the range of the pitch length P21; P31 of the through lug grooves 321; 331 has the upper limit, and the range of the maximum groove depth H21; H31 of the through lug grooves 321; 331 has the lower limit. As a result, the edge component of the land portion 32; 33 is ensured, and the traction action of the through lug grooves 321; 331 during traveling on snowy road surfaces is ensured.

Additionally, in the tire 1, the maximum groove width W21; W31 of the through lug grooves 321; 331 is in a range of from 1.5 mm or greater to 4.0 mm or less. As a result, there is an advantage that the maximum groove width W21; W31 of the through lug grooves 321; 331 is made appropriate.

In the tire 1, the through lug grooves 321; 331 have a zigzag shape (FIG. 3). Additionally, the amplitude (not illustrated) of the through lug grooves 321; 331 is in a range of from 2.0% or greater to 7.0% or less with respect to the pitch length (not illustrated) of the through lug grooves 321; 331. Furthermore, the wavelength of the through lug grooves 321; 331 is in a range of from 16% or greater to 22% or less with respect to the maximum ground contact width Wb2; Wb3 of the land portion 32; 33. As a result, there is an advantage that the zigzag shape of the through lug grooves 321; 331 is made appropriate, and the effect of improving the tire traction performance due to the through lug grooves 321; 331 is ensured.

Additionally, in the tire 1, the inclination angle θ21; θ31 of the through lug grooves 321; 331 with respect to the tire circumferential direction is in a range of from 60° or greater to 120° or less (see FIGS. 4 and 7). The lower limit provides an advantage that the effect of improving the traction performance due to the through lug grooves 321; 331 is ensured and the upper limit provides an advantage that the rigidity of the land portion 32; 33 is ensured appropriately.

Additionally, in the tire 1, a portion 321A; 331A of the plurality of through lug grooves 321; 331 has a groove bottom sipe 323; 333 (see FIGS. 4 and 7). Additionally, the through lug grooves 321A; 331A having the groove bottom sipe 323; 333 and at least one through lug groove 321B; 331B not having the groove bottom sipe are alternately arranged in the tire circumferential direction. In such a configuration, since the through lug grooves 321A; 331A have the groove bottom sipe 323; 333, there is an advantage that the acceleration performance on snow of the tire is improved. In addition, since the through lug grooves 321A; 331A having the groove bottom sipe 323; 333 and the through lug grooves 321B; 331B not having the groove bottom sipe are alternately arranged in the tire circumferential direction, there is an advantage that the rigidity of the land portion 32; 33 is ensured, and the rolling resistance of the tire is reduced.

Additionally, the distance H23' (see FIG. 5): H33' from the groove bottom of the through lug grooves 321; 331 to the maximum depth position of the groove bottom sipe 323; 333 is in a range of 6% or greater with respect to the maximum groove depth Hg1; Hg2 of the main groove 21; 22. Additionally, the distance H23; H33' from the tread contact surface to the maximum depth position of the groove bottom sipe 323; 333 is in a range of 100% or less with respect to the maximum groove depth Hg1; Hg2 of the main groove 21; 22. Due to this, there is an advantage that the depth of the groove bottom sipe 323; 333 is made appropriate. Specifically, the lower limit provides an advantage that the effect of improving the acceleration performance on snow due to the groove bottom sipe 323; 333 is ensured and the upper limit provides an advantage that the rigidity of the land portion 32; 33 is ensured and the rolling resistance of the tire is reduced.

Additionally, in the tire 1, the adjacent land portions 32, 33 each include the through lug groove 321, 331 (see FIG. 3). In addition, one through lug groove 321A; 331A of the pair of through lug grooves 321, 331 facing each other with the main groove 22 disposed therebetween has the groove bottom sipe 323; 333, and the other through lug groove 331B; 323B does not have the groove bottom sipe. As a result, there is an advantage that the rigidity between adjacent land portions 32, 33 is made uniform and the rolling resistance of the tire is reduced.

Additionally, in the tire 1, the maximum ground contact width Wb2; Wb3 of the land portion 32; 33 is in a range of from 15% or greater to 25% or less with respect to the tire ground contact width TW (see FIG. 2). Due to this, there is an advantage that the land portion 32; 33 is made appropriate.

Additionally, in the tire 1, the first and second edge portions of the land portion 32; 33 have a zigzag shape or a wave-like shape having an amplitude in the tire width direction and are disposed so as to be out of phase in the tire circumferential direction (see FIG. 3). Additionally, the through lug grooves 321; 331 extend so as to be inclined with respect to the tire circumferential direction to connect the maximum amplitude positions of the first and second edge portions. In such a configuration, since the edge portions of the land portion 32; 33 have a zigzag shape or a wave-like shape, there is an advantage that the acceleration performance on snow of the tire is improved as compared to a configuration in which the edge portions of the land portion have a straight shape (not illustrated). In addition, since the through lug grooves 321; 331 are open to the maximum amplitude position of the edge portions of the land portions, there is an advantage that uneven wear of the land portion 32; 33 is reduced as compared to configurations in which the grooves are open to other positions.

Additionally, in the tire 1, the first and second edge portions of the land portion 32; 33 have a wave-like shape formed by connecting a plurality of arcs having an amplitude in the tire width direction (see FIG. 3). In addition, the circumferential length of the arc (not illustrated) is in a range of 80% or greater with respect to the wavelength λ2; λ3 of the wave-like shape. In such a configuration, there is an advantage that uneven wear of the land portion 32; 33 is suppressed as compared to a configuration in which the land portion has an edge portion having a zigzag shape or a sinusoidal shape.

Additionally, in the tire 1, the wave-like shape of the first and second edge portions of the land portion 32; 33 is formed by connecting a plurality of arcs that project toward the tire equatorial plane CL (see FIG. 3). As a result, there is an advantage in that the uneven wear of the land portion 32; 33 is effectively suppressed.

Effect 2

The tire 1 includes a plurality of main grooves 21, 22 extending in the tire circumferential direction and a plurality of land portions 31 to 33 defined by the main grooves 21, 22 (See FIG. 2). Additionally, at least one row of land portions (in FIG. 2, left and right shoulder land portions 31, 31) includes a plurality of narrow shallow grooves 311 having a U-shape with an opening portion facing the tire ground contact edge T and terminating in the ground contact surface of the land portion 31 (see FIG. 8).

In such a configuration, (1) since the narrow shallow grooves 311 have a U-shape, there is an advantage that the acceleration performance on snow of the tire during traveling of the vehicle is improved due to the circumferential components of the narrow shallow grooves 311 as compared to a configuration including a plurality of I-shaped width direction narrow grooves arranged in the tire circumferential direction (not illustrated). Additionally, (2) since the narrow shallow grooves 311 have a U-shape with the opening portion facing the tire ground contact edge T, the circumferential components of the narrow shallow grooves in the region on the tire ground contact edge T side can be omitted as compared to, for example, a configuration provided with narrow shallow grooves having an annular structure (not illustrated). As a result, there is an advantage that the noise performance of the tire during traveling of the vehicle is improved, and uneven wear originating from the narrow shallow grooves 311 is suppressed. Additionally, (3) since the narrow shallow grooves 311 have a closed structure that terminates in the ground contact surface of the land portion 31, there is an advantage that the tire noise performance is improved as compared to a configuration provided with the narrow shallow grooves that pass through the ground contact surface of the land portion in the tire width direction or the tire circumferential direction (not illustrated).

Additionally, in the tire 1, the land portion 31 including the narrow shallow grooves 311 is a rib having a road contact surface continuous in the tire circumferential direction (see FIG. 8). As a result, there is an advantage that the rigidity of the land portion 31 is ensured and the acceleration performance on snow of the tire is improved. Additionally, there is an advantage that the tire noise performance is improved as compared to a configuration provided with the narrow shallow grooves that pass through the ground contact surface of the land portion in the tire width direction (not illustrated).

Additionally, in the tire 1, the maximum groove width Wn (see FIG. 9) of the narrow shallow grooves 311 is in a range of $0.1 \text{ mm} \leq Wn \leq 5.0 \text{ mm}$, and the maximum groove depth Hn (see FIG. 10) of the narrow shallow grooves 311 has a relationship of $0.01 \leq Hn/Hg1 \leq 0.30$ with respect to the maximum groove depth Hg1 of the shoulder main grooves 21. As a result, there is an advantage that the maximum groove width Wn and the maximum groove depth Hg1 of the narrow shallow grooves 311 are made appropriate.

Additionally, in the tire 1, the width direction length W11 of the narrow shallow grooves 311 has a relationship of $0.40 \leq W11/Wb1 \leq 0.90$ with respect to the maximum ground contact width Wb1 of the land portion 31 (see FIG. 8). The lower limit provides an advantage that the edge component of the narrow shallow grooves 311 in the tire circumferential direction is ensured, and the effect of improving the acceleration performance on snow of the tire is ensured. The upper limit provides an advantage that the distances D3, D4 (see FIG. 8) between the narrow shallow grooves 311 and the edge portions of the land portions 31 is ensured, and the rigidity of the land portions 31 is ensured.

Additionally, in the tire 1, the circumferential length L11 of the narrow shallow grooves 311 has a relationship of $0.50 \leq L11/P11 \leq 0.90$ with respect to the pitch length P11 of the narrow shallow grooves 311 (see FIG. 8). The lower limit provides an advantage that the circumferential component of the U-shape of the narrow shallow grooves 311 is ensured, and the acceleration performance on snow of the tire during traveling of the vehicle is ensured. The upper limit provides an advantage that degradation of the noise performance of the tire due to excessive circumferential components of the narrow shallow grooves 311 is suppressed.

Additionally, in the tire 1, the distance D1 between the pair of terminating points A1, A2 of the narrow shallow grooves 311 in the tire circumferential direction has a relationship of $0.30 \leq D1/P11 \leq 0.90$ with respect to the pitch length P11 of the narrow shallow grooves 311 (see FIG. 8). The lower limit provides an advantage that the opening width of the U-shape of the narrow shallow grooves 311 is ensured, and the degradation of the noise performance of the tire is suppressed. The upper limit provides an advantage that the interval between the terminating points A1, A2 of adjacent narrow shallow grooves 311, 311 is ensured.

Additionally, in the tire 1, the distance D2 (see FIG. 9) between the pair of terminating points A1, A2 of the narrow shallow grooves 311 in the tire width direction has a relationship of $0 \leq D2/Wb1 \leq 0.70$ with respect to the maximum ground contact width Wb1 of the land portion 31 (see FIG. 8). In such a configuration, since the pair of terminating points A1, A2 of the narrow shallow grooves 311 is at the same position in the tire width direction, there is an advantage that the rigidity of the shoulder land portion 31 is made uniform and uneven wear resistance of the shoulder land portion 31 is suppressed.

Additionally, in the tire 1, when the pair of terminating points A1, A2 of the narrow shallow grooves 311 and the innermost point B in the tire width direction are defined, and the imaginary line L1 passing through the midpoint M and the innermost point B of the terminating points A1, A2 is defined, the angle $\theta11$ between the imaginary line L1 and the tire circumferential direction is in a range of $45° \leq \theta11 \leq 135°$ (see FIG. 9). As a result, there is an advantage that the opening direction of the U-shape of the narrow shallow grooves 311 is made appropriate, and the noise performance of the tire during traveling of the vehicle is improved.

Additionally, in the tire 1, the U-shape of the narrow shallow grooves 311 has at least one width direction extending portion Ra1, Ra2 with an inclination angle of from 75° or greater to 105° or less with respect to the tire circumferential direction (see FIG. 9). The sum $\Sigma La$ of the width direction lengths La1 to La4 of the width direction extending portions Ra1, Ra2 has a relationship of $1.00 \leq \Sigma La/W11$ with respect to the width direction length W11 of the narrow shallow groove 311. In such a configuration, since the total length $\Sigma La$ of the width direction extending portions Ra1, Ra2 extending substantially perpendicular to the tire circumferential direction is ensured, there is an advantage that the effect of improving the acceleration performance on snow during straight traveling of a vehicle due to the narrow shallow grooves 311 is efficiently ensured.

Additionally, in the tire 1, the U-shape of the narrow shallow grooves 311 has a pair of adjacent width direction extending portions Ra1, Ra1; Ra2, Ra2 and a crank-shaped or S-shaped bent portion (reference sign is omitted in drawings) connecting the pair of width direction extending portions Ra1, Ra1; Ra2, Ra2 (see FIG. 9). As a result, there is an advantage that the circumferential components of the narrow shallow grooves 311 are increased and the tire noise performance during traveling of the vehicle is improved.

Additionally, in the tire 1, the U-shape of the narrow shallow grooves 311 has a continuous circumferential extending portion Rb with an inclination angle of from 0° or greater to 15° or less with respect to the tire circumferential direction (see FIG. 9). Additionally, the circumferential length Lb of the circumferential extending portion Rb has a relationship of $0.50 \leq Lb/L11$ with respect to the circumferential length L11 of the narrow shallow grooves 311. In such a configuration, the length Lb of the circumferential extending portion Rb extending substantially in parallel to the tire circumferential direction is ensured. As a result, there is an advantage that the effect of improving the acceleration performance on snow during traveling of the vehicle by the narrow shallow grooves 311 is efficiently ensured.

Target of Application

Additionally, the tire 1 is a heavy duty tire mounted on a steering axle of a vehicle. When such a tire is used as the target of application, there is an advantage that the effect of improving the uneven wear resistance performance and the tear resistance performance of the tire is effectively obtained, and the demand for acceleration performance on snow in all-season tires is satisfied.

In addition, in this embodiment, a pneumatic tire is described as an example of a tire. However, no such limitation is intended, and the configuration described in this embodiment can be applied to other tires in the scope obviousness to those skilled in the art. Examples of other tires include airless tires, solid tires, and the like.

Example 1

FIG. 24 is a table showing the results of performance tests of tires according to the embodiment of the technology.

In the performance tests, (1) acceleration performance on snow and (2) low rolling resistance performance are evaluated for a plurality of types of test tires. Test tires having a tire size of 315/70R22.5 are mounted on a rim having a rim size of 22.5×9.00, and an internal pressure of 900 kPa and a specified load of JATMA are applied to the test tires. The test tires are mounted on the steering axle of the 4×2 tractor.

Evaluation of acceleration performance on snow is performed by measuring the distance required for acceleration from a specified initial speed to a termination speed under test conditions conforming to R117-2 (Regulation No. 117 Revision 2) of the ECE (East Commission for Europe). In this evaluation, larger values are preferable.

In the evaluation of low rolling resistance performance, a drum testing machine with a drum diameter of 1707 mm is used, and the rolling resistance coefficients of the test tires are calculated under conditions of a load of 33.3 kN, an air pressure of 900 kPa, and a speed of 80 km/h in accordance with ISO (International Organization for Standardization) 28580. Results of the evaluation are expressed as index values and evaluated with Conventional Example being assigned as the reference (100). In this evaluation, larger values are preferable.

In the test tire of Example 1, in the configuration illustrated in FIGS. 1 and 2, the edge portions of the shoulder main grooves 21 and the center main grooves 22 have a zigzag shape. Additionally, the groove depth of the shoulder main grooves 21 and the center main grooves 22 is 14.6 mm, and the groove width is 15.3 mm. Each of the through lug grooves 321, 331 has a zigzag shape, and has an inclination angle θ21, θ31 of 75° with respect to the tire circumferential direction. Additionally, the tire ground contact width TW is 268 mm, the maximum ground contact width Wb1 of the shoulder land portion 31 is 49.5 mm, the maximum ground contact width Wb2 of the middle land portion 32 is 36.0 mm, and the maximum ground contact width Wb3 of the center land portion 33 is 36.0 mm. The test tires of other examples are modified examples of the test tire of Example 1.

In the test tires of Comparative Example, the pitch lengths P21, P31 of the through lug grooves 321, 331 of the middle land portion 32 and the center land portion 33 are set to be larger than those of the test tires of Example 1.

As can be seen from the test results, the acceleration performance on snow and the low rolling resistance performance of the tire are achieved in a compatible manner in the test tires of Examples.

Example 2

Figure 26:
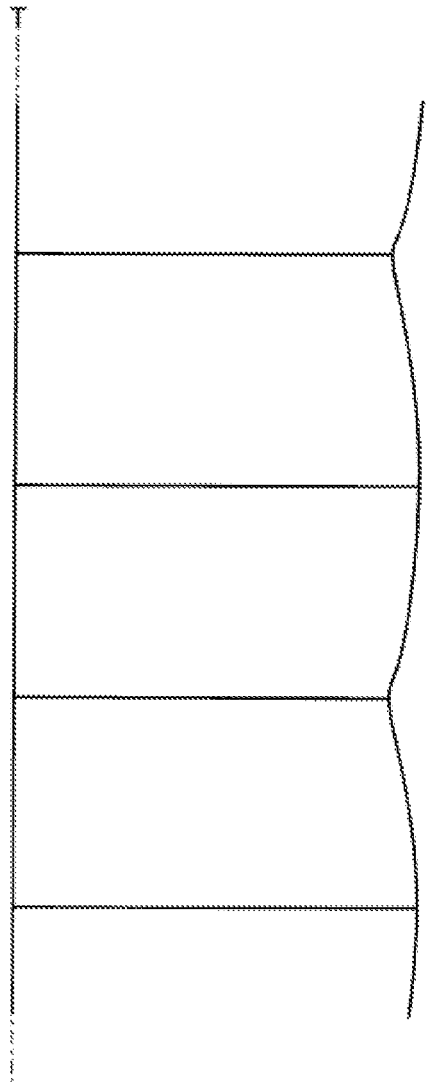
FIG. 26 is an explanatory diagram illustrating a shoulder land portion of the test tire of Comparative Example illustrated in FIG. 25.

FIG. 25 is a table showing the results of performance tests of tires according to the embodiment of the technology. FIG. 26 is an explanatory diagram illustrating a shoulder land portion of the test tire of Comparative Example illustrated in FIG. 25.

In the performance tests, (1) acceleration performance on snow and (2) pass-by noise performance are evaluated for a plurality of types of test tires. Test tires having a tire size of 315/70R22.5 are mounted on a rim having a rim size of 22.5×9.00, and an internal pressure of 900 kPa and a specified load of JATMA are applied to the test tires. The test tires are mounted on the steering axle of the 4×2 tractor.

Evaluation of acceleration performance on snow is performed by measuring the distance required for acceleration from a specified initial speed to a termination speed under test conditions conforming to R117-2 (Regulation No. 117 Revision 2) of the ECE (East Commission for Europe). In this evaluation, larger values are preferable. Moreover, if the value is 96 or higher, it is deemed that the performance is appropriately ensured.

In the evaluation of the pass-by noise performance, the pass-by noise is measured under test conditions conforming to R117-2 of the ECE. Then, on the basis of the measurement results, the decibel difference is calculated with Comparative Example being assigned as the reference (0). Smaller values are preferable.

The test tire of Example 16 has the configuration of FIGS. 1, 2, and 8. Additionally, the groove depth of the shoulder main grooves 21 and the center main grooves 22 is 14.6 mm, and the groove width is 15.3 mm. Additionally, the through lug grooves 321, 331 have a maximum groove width W21 of 2.1 mm and a maximum groove depth H21 of 2.5 mm. Additionally, the tire ground contact width TW is 268 mm, the maximum ground contact width Wb1 of the shoulder land portion 31 is 49.5 mm, the maximum ground contact width Wb2 of the middle land portion 32 is 36.0 mm, and the maximum ground contact width Wb3 of the center land portion 33 is 36.0 mm. In addition, the pitch number of the zigzag shape of the groove opening portions 211, 221 of the main grooves 21, 22 is from 50 or greater to 100 or less. The test tires of other examples are modified examples of the test tire of Example 16.

The test tire of Comparative Example is the test tire of Example 16 in which the narrow shallow groove has a straight shape and passes through the shoulder land portion (see FIG. 26).

As can be seen from the test results, in the test tires of examples, the pass-by noise performance during traveling of the vehicle can be improved while maintaining the acceleration performance on snow of the tire.

The invention claimed is:

1. A tire, comprising:
   a plurality of main grooves extending in a tire circumferential direction; and
   four or more rows of land portions defined by the main grooves,
   at least one row of the land portions comprising a plurality of through lug grooves that pass through the land portions in a tire width direction,
   a pitch length of the through lug grooves being in a range of from 7% or greater to 14% or less of a tire maximum ground contact length,
   the pitch length of the through lug grooves being in a range of from 45% or greater to 80% or less of a maximum ground contact width of the at least one row of the land portions comprising the through lug grooves, a maximum groove depth of the through lug grooves being in a range of from 5% or greater to 25% or less of a maximum groove depth of the main grooves,
a maximum groove width of the through lug grooves being in a range of from 2.0 mm or greater to 4.0 mm or less,
the at least one row of the land portions having a road contact surface continuous in the tire width direction,
the through lug grooves having a zigzag shape,
an amplitude of the zigzag shape of the through lug grooves being in a range of from 2.0% or greater to 7.0% or less with respect to the pitch length of the through lug grooves, and
a wavelength of the zigzag shape of the through lug grooves being in a range of from 16% or greater to 22% or less with respect to a maximum ground contact width of the at least one row of the land portions.

2. The tire according to claim 1, wherein an inclination angle of the through lug grooves with respect to the tire circumferential direction is in a range of from 60° or greater to 120° or less.

3. The tire according to claim 2, wherein a portion of the plurality of through lug grooves comprises a groove bottom sipe, and the through lug grooves comprising the groove bottom sipe and at least one of the through lug grooves not comprising the groove bottom sipe are alternately arranged in the tire circumferential direction.

4. The tire according to claim 3, wherein
a distance from a groove bottom of the through lug grooves to a maximum depth position of the groove bottom sipe is in a range of 6% or greater with respect to the maximum groove depth of the main grooves, and
a distance from a tread contact surface to the maximum depth position of the groove bottom sipe is in a range of 100% or less with respect to the maximum groove depth of the main grooves.

5. The tire according to claim 4, wherein
at least two rows of the land portions are adjacent to each other and the at least two rows of the land portions each comprise the through lug grooves, and
one through lug groove of a pair of through lug grooves facing each other, with one of the main grooves disposed therebetween, comprises the groove bottom sipe and an other through lug groove of the pair of through lug grooves does not comprise the groove bottom sipe.

6. The tire according to claim 5, wherein a maximum ground contact width of the land portions is in a range of from 15% or greater to 25% or less with respect to a tire ground contact width.

7. The tire according to claim 6, wherein
a first edge portion and a second edge portion of the land portions have a zigzag shape or a wave-like shape having an amplitude in the tire width direction and are disposed out of phase in the tire circumferential direction, and
the through lug grooves extend while inclined with respect to the tire circumferential direction to connect maximum amplitude positions of the first and second edge portions.

8. The pneumatic tire according to claim 7, wherein
a first edge portion and a second edge portion of the land portions have a wave-like shape formed by connecting a plurality of arcs having an amplitude in the tire width direction, and
a circumferential length of the arcs is in a range of 80% or greater with respect to a wavelength of the wave-like shape.

9. The tire according to claim 1, wherein
a portion of the plurality of through lug grooves comprises a groove bottom sipe, and
the through lug grooves comprising the groove bottom sipe and at least one of the through lug grooves not comprising the groove bottom sipe are alternately arranged in the tire circumferential direction.

10. The tire according to claim 9, wherein
a distance from a groove bottom of the through lug grooves to a maximum depth position of the groove bottom sipe is in a range of 6% or greater with respect to the maximum groove depth of the main grooves, and
a distance from a tread contact surface to the maximum depth position of the groove bottom sipe is in a range of 100% or less with respect to the maximum groove depth of the main grooves.

11. The tire according to claim 1, wherein
at least two rows of the land portions are adjacent to each other and the at least two rows of the land portions each comprise the through lug grooves, and
one through lug groove of a pair of through lug grooves facing each other, with one of the main grooves disposed therebetween, comprises a groove bottom sipe and an other through lug groove of the pair of through lug grooves does not comprise the groove bottom sipe.

12. The tire according to claim 1, wherein a maximum ground contact width of the land portions is in a range of from 15% or greater to 25% or less with respect to a tire ground contact width.

13. The tire according to claim 1, wherein
a first edge portion and a second edge portion of the land portions have a zigzag shape or a wave-like shape having an amplitude in the tire width direction and are disposed out of phase in the tire circumferential direction, and
the through lug grooves extend while inclined with respect to the tire circumferential direction to connect maximum amplitude positions of the first and second edge portions.

14. The pneumatic tire according to claim 1, wherein
a first edge portion and a second edge portion of the land portions have a wave-like shape formed by connecting a plurality of arcs having an amplitude in the tire width direction, and
a circumferential length of the arcs is in a range of 80% or greater with respect to a wavelength of the wave-like shape.

15. The pneumatic tire according to claim 14, wherein the wave-like shape of the first and second edge portions of the land portions is formed by connecting the plurality of arcs that project toward a tire equatorial plane.

16. The tire according to claim 1, wherein the tire is a heavy duty tire mounted on a steering axle of a vehicle.

17. The pneumatic tire according to claim 1, wherein
the plurality of main grooves extending in the tire circumferential direction consists of four main grooves extending in the tire circumferential direction; and
the four or more rows of land portions defined by the main grooves consists of five rows of the land portions defined by the four main grooves.

18. The pneumatic tire according to claim 1, wherein an inclination angle of the through lug grooves with respect to the tire circumferential direction is in a range of from 65° or greater to 115° or less.

19. The pneumatic tire according to claim 1, wherein the plurality of main grooves are grooves on which a wear indicator must be provided as specified by JATMA and have a maximum groove width of 7.0 mm or greater and a maximum groove depth of 12 mm or greater.

20. The pneumatic tire according to claim 1, wherein the maximum groove width of the through lug grooves is in a range of from 2.0 mm or greater to 3.5 mm or less.

\* \* \* \* \*